United States Patent
Matsushima

(10) Patent No.: US 9,671,245 B2
(45) Date of Patent: Jun. 6, 2017

(54) DISPLAY DEVICE AND ELECTRONIC APPARATUS

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 99 days.

(21) Appl. No.: 14/684,672

(22) Filed: Apr. 13, 2015

(65) Prior Publication Data

US 2015/0294644 A1 Oct. 15, 2015

(30) Foreign Application Priority Data

Apr. 14, 2014 (JP) .................................. 2014-083174

(51) Int. Cl.
  G09G 3/36 (2006.01)
  G02F 1/13 (2006.01)
  G01C 21/36 (2006.01)

(52) U.S. Cl.
  CPC ......... *G01C 21/365* (2013.01); *G09G 3/3648* (2013.01); *G09G 2320/041* (2013.01); *G09G 2330/12* (2013.01); *G09G 2380/14* (2013.01)

(58) Field of Classification Search
  CPC combination set(s) only.
  See application file for complete search history.

(56) References Cited

U.S. PATENT DOCUMENTS

| | | | |
|---|---|---|---|
| 8,766,946 B2 | 7/2014 | Kanda et al. | |
| 2002/0039814 A1* | 4/2002 | Jada | G02F 1/136213 438/155 |
| 2003/0133066 A1* | 7/2003 | Ono | G02F 1/134363 349/141 |
| 2008/0117364 A1* | 5/2008 | Matsushima | G02F 1/1323 349/96 |
| 2008/0231569 A1* | 9/2008 | Yamazaki | G09G 3/3614 345/84 |
| 2009/0115772 A1* | 5/2009 | Shiomi | G09G 3/342 345/214 |
| 2011/0234930 A1* | 9/2011 | Nishida | G09G 3/3655 349/33 |
| 2012/0127408 A1* | 5/2012 | Itoh | G02F 1/133707 349/127 |

FOREIGN PATENT DOCUMENTS

JP 2009-295137 A 12/2009

\* cited by examiner

*Primary Examiner* — Wesner Sajous
(74) *Attorney, Agent, or Firm* — Michael Best & Friedrich LLP

(57) ABSTRACT

According to an aspect, a display device includes a display unit that includes a dielectric material between two substrates that face each other and a plurality of pixel circuits that apply an electric field to the dielectric material according to an image input gradation for each of a plurality of pixels arranged in a matrix, and displays an image using the plurality of pixels; a capacitance detection unit that outputs a detection signal of a magnitude corresponding to a value of capacitance of the dielectric material; and a control device determines, on the basis of the detection signal from the capacitance detection unit, that the display is normal when a correlation value of the capacitance to the image input gradation is in a predetermined correlation.

15 Claims, 18 Drawing Sheets

DISPLAY DEVICE AND ELECTRONIC APPARATUS

CROSS-REFERENCE TO RELATED APPLICATIONS

This application claims priority from Japanese Application No. 2014-083174, filed on Apr. 14, 2014, the contents of which are incorporated by reference herein in its entirety.

BACKGROUND

1. Technical Field

The present invention relates to a display device and an electronic apparatus including the same.

2. Description of the Related Art

As for display devices, in recent years, a demand for display devices for car navigation and display devices for mobile devices such as a mobile phone or an electronic paper is increasing.

On the other hand, a sensing circuit for detecting a contact of an object such as a finger and a pen is known. For example, Japanese Patent Application Laid-open Publication No. 2009-295137 describes a sensing circuit that detects a change in a capacitance value of a capacitive element that is formed with electrodes respectively provided on two substrates facing each other and a dielectric material such as a liquid crystal sandwiched between the electrodes and detects that the object comes in contact with the capacitive element.

When applications to which the display device is applied increase, there may be a case in which the display device is used beyond an assumed operating temperature range. When a liquid crystal layer is used beyond the assumed operating temperature range, optical properties that should respond to an electric field applied to the liquid crystal are not exhibited, and a display image may be disturbed. Therefore, it is desirable to adequately recognize the state of the liquid crystal layer in order to stop the use of the display device when it is used beyond the assumed operating temperature range.

For the foregoing reasons, there is a need for a display device and an electronic apparatus that can reduce the frequency of usage in a condition exceeding an assumed operating temperature range.

SUMMARY

According to an aspect, a display device includes a display unit that includes a dielectric material between two substrates that face each other and a plurality of pixel circuits that apply an electric field to the dielectric material according to an image input gradation for each of a plurality of pixels arranged in a matrix, and displays an image using the plurality of pixels; a capacitance detection unit that outputs a detection signal of a magnitude corresponding to a value of capacitance of the dielectric material; and a control device determines, on the basis of the detection signal from the capacitance detection unit, that the display is normal when a correlation value of the capacitance to the image input gradation is in a predetermined correlation.

According to another aspect, an electronic apparatus comprising a display device that includes a display unit that includes a dielectric material between two substrates that face each other and a plurality of pixel circuits that apply an electric field to the dielectric material according to an image input gradation for each of a plurality of pixels arranged in a matrix, and displays an image using the plurality of pixels arranged in a matrix; a capacitance detection unit that outputs a detection signal of a magnitude corresponding to a value of capacitance of the dielectric material; and a control device determines, on the basis of the detection signal from the capacitance detection unit, that the display is normal when a correlation value of the capacitance to the image input gradation is in a predetermined correlation.

DETAILED DESCRIPTION

Figure 1:
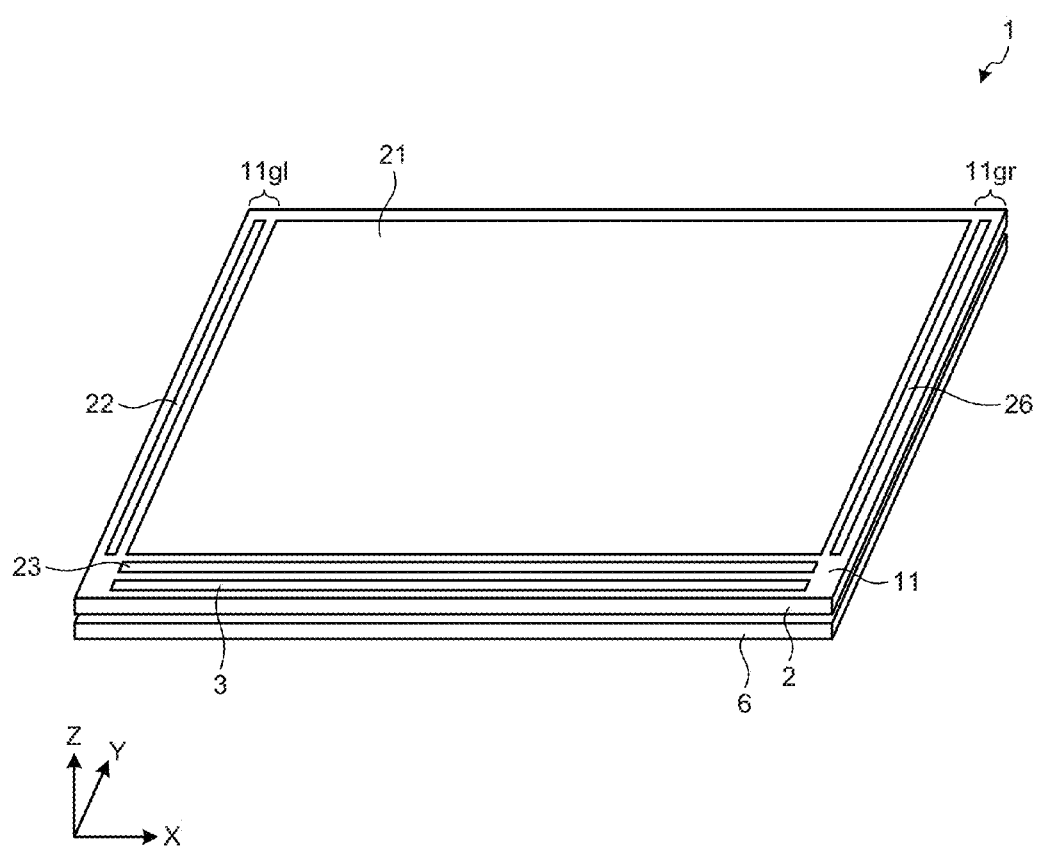
FIG. 1 is an explanatory diagram representing an example of a display device according to a first embodiment.

Exemplary embodiments for implementing the present invention will be explained in detail below with reference to the accompanying drawings. The present invention is not limited by the contents described in the following embodiments. The components described as follows include those which can be easily thought of by persons skilled in the art and those which are substantially equivalents. In addition, the components described below can be arbitrarily combined with each other. The disclosure is only an example, and therefore modifications within the gist of the invention which can be easily thought of by persons skilled in the art are obviously included in the scope of the present invention. Moreover, the widths, the thicknesses, the shapes, and the like of units in the drawings may be schematically represented as compared with those of actual aspects for the sake of clearer description. However, these representations are only examples, and therefore the interpretation of the present invention is not limited thereby. In the present specification and the figures, the same reference signs are assigned to the same elements as those in already described figures, and detailed explanation may be omitted if unnecessary.

First Embodiment

Figure 2:
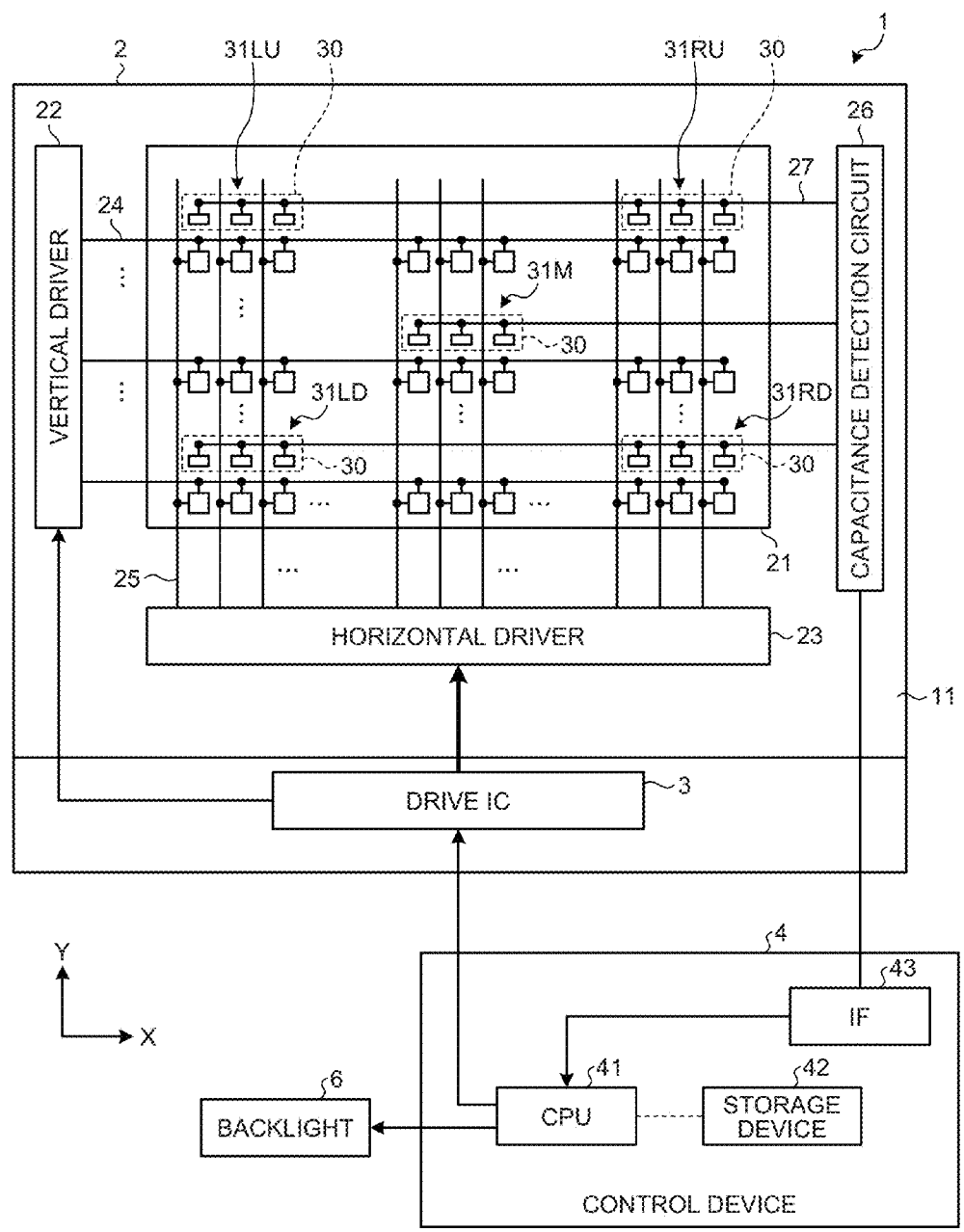
FIG. 2 is a block diagram of a system example of the display device of FIG. 1.

FIG. 1 is an explanatory diagram representing an example of a display device according to a first embodiment. FIG. 2 is a block diagram of a system example of the display device of FIG. 1. FIG. 1 is schematically represented, and therefore the dimensions and shapes are not necessarily the same as actual ones.

A display device 1 includes a liquid crystal display unit 2, a driver integrated circuit (IC) 3, and a backlight 6. The display device 1 may be a transmissive or transflective display device, or may be a reflective display device without the backlight 6. Flexible printed circuits (FPC) (not illustrated) transmit an external signal or drive power for driving the driver IC 3 to the driver IC 3. The liquid crystal display unit 2 includes a translucent insulating substrate such as a glass substrate 11. The liquid crystal display unit 2 includes a display unit 21. Part of the glass substrate 11 functions as part of the display unit 21. The display unit 21 has a number of pixels including liquid crystal cells are arranged in a matrix (in the form of rows and columns). The liquid crystal display unit 2 further includes a horizontal driver (horizontal drive circuit) 23, a vertical driver (vertical drive circuit) 22, and a capacitance detection circuit 26. The glass substrate 11 includes a first substrate, on which a number of pixel circuits including active elements (e.g., transistors) are arranged in the matrix, and a second substrate arranged opposite to the first substrate with a predetermined gap. Part of the first substrate where the pixel circuits are arranged and part of the second substrate which faces the part of the first substrate where the pixel circuits are arranged function as part of the display unit 21. The display unit 21 includes a liquid crystal layer in which liquid crystal is sealed between the first substrate and the second substrate.

Frame regions 11gr and 11gl of the liquid crystal display unit 2 are non-display regions which are on the surface of the glass substrate 11 and with no display unit 21 on which a number of pixels including liquid crystal cells are arranged in a matrix (in the form of rows and columns). In the present embodiment, one direction along a plane of the display unit 21 is set as an X direction, a direction perpendicular to the X direction is set as a Y direction, and a direction perpendicular to the X-Y plane is set as a Z direction. The vertical driver 22 is disposed in the frame region 11gl extending in the Y direction. The capacitance detection circuit 26 is disposed in the frame region 11gr which is a different side from the frame region 11gl and extends in the Y direction. The horizontal driver 23 and the driver IC 3 are arranged along one side extending in the X direction between the frame region 11gl and the frame region 11gr, the one side being in the periphery (frame) of the display unit 21 in which the frame region 11gl and the frame region 11gr are also included. The layout of the vertical driver 22, the capacitance detection circuit 26, the horizontal driver 23, and the driver IC 3 is not limited to the arranged positions illustrated in FIG. 1.

The backlight 6 is an example of an illumination unit and disposed on the back side of the liquid crystal display unit 2 (the face on the other side of the face where an image is displayed when viewed from the Z direction). The backlight 6 irradiates light toward the liquid crystal display unit 2 and causes the light to enter the entire surface of the display unit 21. Examples of the backlight 6 include, but are not limited to, a light source and a light guide plate that guides the light output from the light source to be output toward the back side of the liquid crystal display unit 2. The backlight 6 may include a plurality of light sources arrayed along the X direction or the Y direction, and the light amount of each of the light sources may be independently controlled. This enables the backlight 6 to cause the light emitted by only part of the light sources to enter part of the liquid crystal display unit 2. In the display device 1 of the present embodiment, the light source is explained using the backlight 6 disposed on the back side of the liquid crystal display unit 2, but a front light disposed on the surface side of the liquid crystal display unit 2 may be used.

System Configuration Example of Display Device

The liquid crystal display unit 2 includes the display unit 21, the driver IC 3 having functions of an interface (I/F) and a timing generator, the capacitance detection circuit 26, the vertical driver 22, and the horizontal driver 23.

As illustrated in FIG. 2, in the display unit 21, pixels Vpix that include the liquid crystal layer have a matrix structure in which units each forming one pixel on the display are arranged in m rows×n columns. The pixel Vpix has a pixel circuit that applies an electric field to a dielectric material forming the liquid crystal layer. In this specification, the row indicates a pixel row having n pieces of pixels Vpix arrayed in one direction. The column indicates a pixel column having m pieces of pixels Vpix arrayed in the direction perpendicular to the direction in which the rows are arrayed. The values of m and n are determined according to a vertical display resolution and a horizontal display resolution. In the display unit 21, each of scan lines 24 is wired in each row and each of data lines 25 is wired in each column with respect to an m-row/n-column array of the pixels Vpix. The display unit 21 is disposed in a region where the scan lines 24 and the data lines 25 overlap with black matrixes of a color filter when viewed from the direction perpendicular to the front face. The display unit 21 has an opening in each region where no black matrix is arranged.

A capacitance detection unit 30 is arranged with respect to the display unit 21. In the first embodiment, a plurality of capacitance detection units 30 are arranged in different positions of the display unit 21, so that the capacitance detection units 30 are respectively arranged in an upper left corner display region 31LU, a lower left corner display region 31LD, a center display region 31M, an upper right corner display region 31RU, and a lower right corner display region 31RD. The capacitance detection unit 30 may be provided in each of the pixels Vpix. Each pixel Vpix may be provided with one capacitance detection unit 30 in the center display region 31M; whereas, each pixel group including a plurality of pixels Vpix may be provided with one capacitance detection unit 30 in each of the upper left corner display region 31LU, the lower left corner display region 31LD, the upper right corner display region 31RU, and the lower right corner display region 31RD. With this structure, when the respective regions of the same area are compared with each other, a detection density of the capacitance detection unit 30 in the center display region 31M becomes high as compared with the others in same area units, and each detection density thereof in the upper left corner display region 31LU, the lower left corner display region 31LD, the upper right corner display region 31RU, and the lower right corner display region 31RD becomes low. In this way, the example in which the detection density in the center display region 31M is high has been explained; however, the region of the high detection density can be arbitrarily set.

A master clock, a horizontal synchronization signal, and a vertical synchronization signal, which are external signals input from an external device, are input to the liquid crystal display unit 2 and supplied to the driver IC 3. The driver IC 3 performs level conversion (boosting) of the master clock, the horizontal synchronization signal, and the vertical synchronization signal, each of which has a voltage magnitude of an external power supply, to those having a voltage magnitude of an internal power supply required for driving the liquid crystal, and generates a master clock, a horizontal synchronization signal, and a vertical synchronization signal. The driver IC 3 supplies the generated master clock, horizontal synchronization signal, and vertical synchronization signal to the vertical driver 22 and the horizontal driver 23. The driver IC 3 generates a common potential (counter electrode potential) Vcom to be commonly supplied to a pixel electrode for each pixel Vpix, and supplies the generated common potential to the display unit 21.

The vertical driver 22, on the basis of the data output from the driver IC 3, sequentially outputs data for one line as a vertical scan pulse, and supplies the data to the scan lines 24 of the display unit 21, to thereby sequentially select pixels Vpix row by row. The vertical driver 22 and the capacitance detection circuit 26 are arranged in the extending direction of the scan lines 24 so as to sandwich the scan lines 24 therebetween. The vertical driver 22 sequentially outputs the data in the order from, for example, an upper side of the display unit 21 for the scan lines 24 i.e. from an upper direction of vertical scanning to a lower side of the display unit 21 i.e. to a lower direction of the vertical scanning. The vertical driver 22 can also sequentially output the data in the order from a lower side of the display unit 21 for the scan lines 24 i.e. from a lower direction of vertical scanning to an upper side of the display unit 21 i.e. to an upper direction of the vertical scanning.

The horizontal driver 23 is supplied with data for image input of, for example, 6-bit R (red), G (green), and B (blue). The horizontal driver 23 writes the display data to pixels Vpix of a row selected through vertical scanning performed by the vertical driver 22 for each pixel, or for each pixels, or for all pixels at a time via the data lines 25.

The capacitance detection circuit 26 selects each capacitance detection unit 30, and detects a detection signal of a magnitude corresponding to the value of capacitance of the dielectric material in the liquid crystal via a capacitance detection line 27. The capacitance detection circuit 26 outputs the detected detection signal to a control device 4.

The control device 4 includes, for example, a central processing unit (CPU) 41 serving as an arithmetic device and a storage device 42 serving as a memory, and can implement various functions by executing programs using these hardware resources. Specifically, the control device 4 reads a program stored in the storage device 42 to load it to the memory, and has the CPU 41 execute instructions included in the program loaded to the memory. The control device 4 performs control so that the driver IC 3 can handle the image to be displayed on the display unit 21 as information on an image input gradation according to the execution result of the instruction performed by the CPU 41. In the control device 4 according to the first embodiment, the CPU 41 calculates a correlation value of the capacitance to the image input gradation of the image displayed on the display unit 21 using the detection signal input from the capacitance detection circuit 26, via an interface IF such as an analog-to-digital (A/D) converter, and stores the calculation result in the storage device 42.

Figure 3:
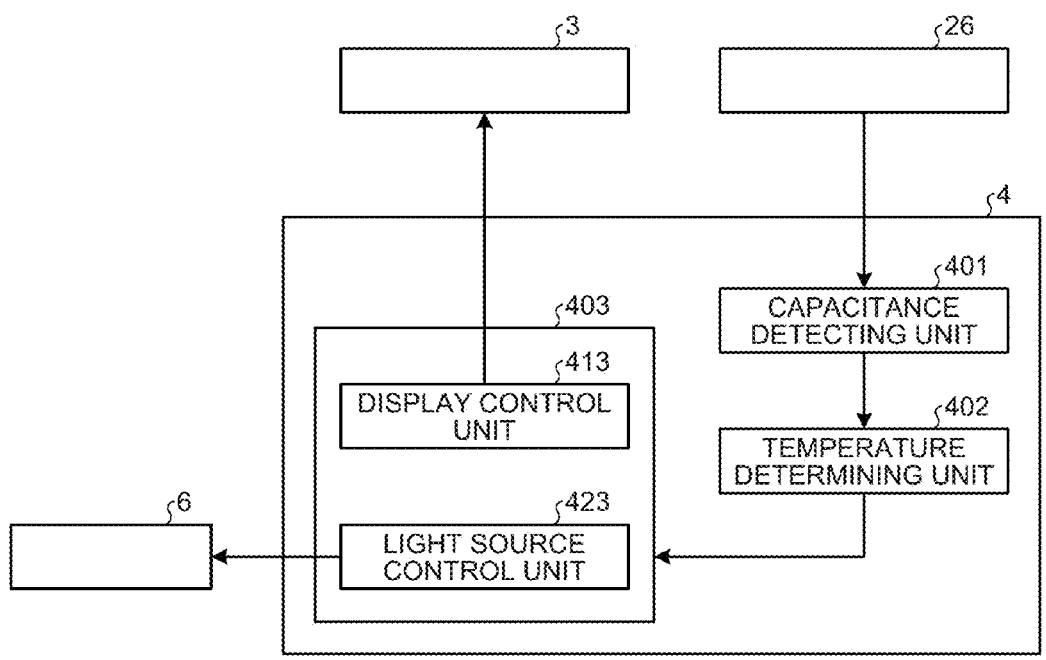
FIG. 3 is a functional block diagram for explaining a control device of the display device according to the first embodiment.

FIG. 3 is a functional block diagram for explaining the control device of the display device according to the present embodiment. The control device 4 includes a capacitance detecting unit 401, a temperature determining unit 402, and a control unit 403 as functions of implementing various functions by executing the program using the hardware resources. The control unit 403 includes a display control unit 413 that controls the image displayed on the display unit 21 so that the driver IC 3 handles the image displayed on the display unit 21 as information on the image input gradation, and a light source control unit 423 that controls the light amount of the backlight 6.

The capacitance detecting unit 401 can detect the detection signal of one capacitance detection unit 30 in a time division manner. For example, the capacitance detecting unit 401 can select one of the capacitance detection units 30 provided in different positions of the display unit 21 and detect information on values of the capacitance sampled at different sampling time points via the capacitance detection circuit 26.

The capacitance detecting unit 401 can select the respective capacitance detection units 30 provided in different positions of the display unit 21 at a time and detect information on values of the capacitance sampled at the same sampling time point via the capacitance detection circuit 26. The capacitance detecting unit 401 increases the number of selections to select the capacitance detection units 30 provided in a specific display region of different display regions in the display unit 21 more than that of the other display regions, and can thereby detect information on the values of the capacitance sampled at the same sampling time point.

The temperature determining unit 402 stores a plurality of values of the capacitance detected by the capacitance detecting unit 401, calculates a correlation value of the capacitance to the image input gradation, and determines the temperature when the correlation value is within a predetermined range of correlation. For example, the temperature determining unit 402 plots the image input gradation displayed on a specific pixel Vpix of the display unit 21 and the capacitance of the pixel Vpix, which is detected and stored in the capacitance detecting unit 401, in the correlation between the image input gradation and the capacitance value. The temperature determining unit 402 calculates a relative angle between an approximate curve of the plotted correlation value and a predetermined reference line, and determines, when the relative angle is a predetermined threshold angle or more, that the temperature is abnormal (high temperature or low temperature) with respect to the display of the display unit 21 because the correlation value is beyond the predetermined range of correlation. The predetermined reference line is, as explained later, a temperature upper limit line in which a capacitance value becomes constant when the temperature exceeds, for example, an isotropic phase transition temperature. The temperature determining unit 402 stores a plurality of values of the capacitance detected by the capacitance detecting unit 401, calculates a correlation value of the capacitance to the image input gradation, and can determine that the temperature is normal with respect to the display of the display unit 21 based on a relationship of the calculated correlation value to the reference line. The temperature determining unit 402 stores a plurality of values of the capacitance detected by the capacitance detecting unit 401, calculates a correlation value of the capacitance to the image input gradation, and can determine that the temperature is abnormal (high temperature or low temperature) with respect to the display of the display unit 21 based on a relationship of the calculated correlation value to the reference line.

The predetermined reference line may be a reference line in an appropriate state that can be calculated from a plotted point between the image input gradation being maximum gradation displayed on a specific pixel Vpix of the display unit 21 and the capacitance of the pixel Vpix and from a plotted point between the image input gradation being minimum gradation displayed on a specific pixel Vpix of the display unit 21 and the capacitance of the pixel Vpix at a reference temperature (for example, at normal temperature such as 25 degrees). The reference line in the appropriate state can be set depending on an individual difference and a temporal change of the display unit 21.

Alternatively, as a range in which the display unit 21 can perform normal display, the temperature determining unit 402 may store a range of values of the capacitance detected by the capacitance detecting unit 401 in an appropriate temperature range for each image input gradation in the form of a table or an arithmetic expression as a reference range. The temperature determining unit 402 stores the values of the capacitance detected by the capacitance detecting unit 401, calculates a correlation value of the capacitance to the image input gradation, and can determine that the temperature is appropriate with respect to the display of the display unit 21 when the calculated correlation value is within the reference range because the correlation value is within a predetermined range of correlation. The temperature determining unit 402 stores the values of the capacitance detected by the capacitance detecting unit 401, calculates a correlation value of the capacitance to the image input gradation, and can determine that the temperature is abnormal (high temperature or low temperature) with respect to the display of the display unit 21 when the calculated correlation value exceeds the reference range because the correlation value is beyond the predetermined range of correlation.

When the temperature determining unit 402 determines that the temperature is abnormal (high temperature or low temperature) with respect to the display of the display unit 21, the display control unit 413 may set the image input gradation input to the driver IC 3 to be the minimum gradation or the maximum gradation. For example, the capacitance values of liquid crystal molecules approach a constant upon high temperature, and are close to an intermediate value between the capacitance value indicated by the minimum gradation of the image input gradation and the capacitance value indicated by the maximum gradation of the image input gradation. In other words, the capacitance values of liquid crystal molecules are close to a capacitance value indicated by an intermediate gradation of the gradation range of the image input gradation. When the temperature determining unit 402 determines that the temperature is abnormal (high temperature or low temperature) with respect to the display of the display unit 21, by setting the image input gradation input to the driver IC 3 to be the minimum gradation or the maximum gradation, the display control unit 413 can provide a viewer with an image whose input gradation is represented by the minimum gradation or the maximum gradation and which is displayed in the entire display unit, and enables the viewer to recognize that the temperature is in the abnormal state. In addition, because the change in the image input gradation is suppressed, the viewer can easily check a location at the high temperature when viewing the display unit 21. When a liquid crystal layer 54 is in a normal display state, the temperature determining unit 402 can determine that the temperature is appropriate with respect to the display of the display unit 21.

The light source control unit 423 may set the backlight 6 in a non-lighting state, while the control device 4 supplies the driver IC 3 with the image whose image input gradation changes and the capacitance detecting unit 401 continuously detects the capacitance value. By setting the backlight 6 in the non-lighting state, the influence of the heat of the backlight 6 is reduced, the temperature of the display unit 21 quickly lowers, and the display is more easily changed to normal. Moreover, the control device 4 enables the viewer to recognize that the temperature is in the abnormal state. When the liquid crystal layer 54 becomes in the normal display state, the temperature determining unit 402 can determine that the temperature is appropriate with respect to the display of the display unit 21. The light source control unit 423 may lower the light amount of the backlight 6, while the control device 4 supplies the driver IC 3 with the image whose image input gradation changes, and the capacitance detecting unit 401 continuously detects the capacitance value.

When the backlight 6 includes a plurality of light sources arrayed along the X direction or the Y direction so that the light sources can be separately driven, that is, so that the light amount of each of the light sources is independently controlled, the capacitance detecting unit 401 may detect the capacitance for each of a plurality of partial regions of the display unit 21, the temperature determining unit 402 may determine the temperature for each of the partial regions on the basis of the values of the capacitance detected by the capacitance detecting unit 401, and the light source control unit 423 may suppress the amount of light which is irradiated to a partial region where the display is abnormal.

When the temperature determining unit 402 determines that the temperature is abnormal (high temperature or low temperature) with respect to the display of the display unit 21, the control unit 403 can perform control so that the temperature is decreased to a temperature at which the display of the display unit 21 becomes normal by using a cooling device such as a fan or an air conditioner (not illustrated).

Figure 4:
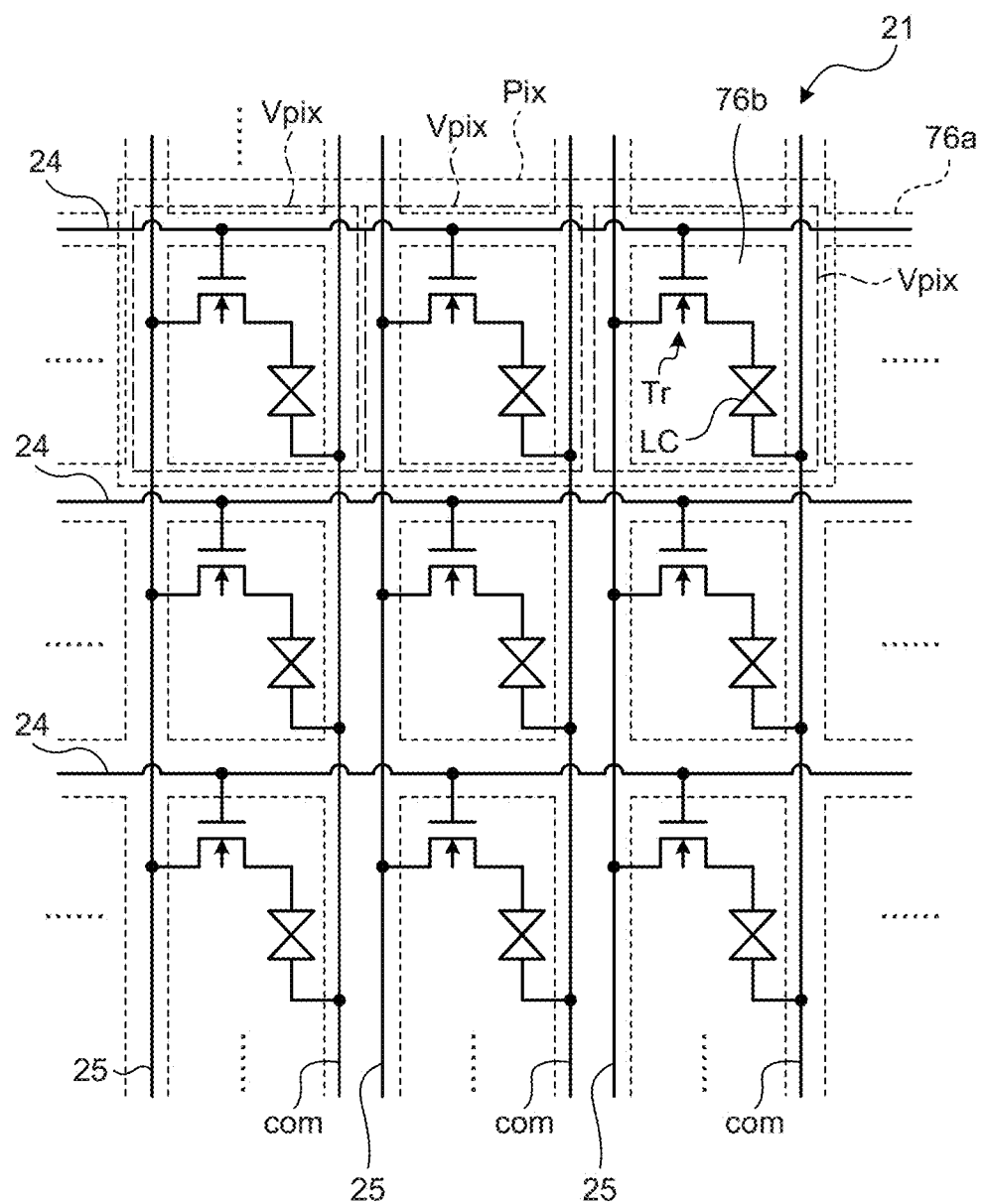
FIG. 4 is a circuit diagram of an example of a drive circuit for driving pixels.

FIG. 4 is a circuit diagram of an example of a drive circuit for driving pixels. Formed on the display unit 21 are wirings such as the data lines 25 for supplying a pixel signal as display data to thin film transistors (TFT) Tr of the pixels Vpix illustrated in FIG. 4 and the scan lines 24 for driving the thin film transistors Tr. In this way, the data lines 25 are extended along a plane parallel to the surface of the glass substrate 11, and supply the pixel signal for displaying an image to the pixels Vpix. The pixel Vpix includes the thin film transistor Tr and a liquid crystal capacitor LC. The thin film transistor Tr is formed of an n-channel metal oxide semiconductor (MOS) TFT in this example. Either one of a source and a drain of the thin film transistor Tr is coupled to the data line 25, a gate thereof is coupled to the scan line 24, and the other one of the source and the drain is coupled to one end of the liquid crystal capacitor LC. The liquid crystal capacitor LC is coupled at its one end to the thin film transistor Tr, and is coupled at the other end to a common potential Vcom of a common electrode com.

A pixel Vpix is coupled to the other pixels Vpix belonging to the same row in the display unit 21 through the scan line 24. The vertical driver 22 sequentially applies the vertical scan pulse to the scan line 24 in the scan direction. A pixel Vpix is coupled to the other pixels Vpix belonging to the same column in the display unit 21 through the data line 25. The data lines 25 are coupled to the horizontal driver 23 and are supplied with the pixel signal from the horizontal driver 23. The common electrode com is coupled to the drive electrode driver (not illustrated). The drive electrode driver supplies a voltage (common potential Vcom) to the common electrode com. Moreover, the common electrode com supplies the common potential Vcom to a pixel Vpix and also to the other pixels Vpix belonging to the same column of the display unit 21. The common electrode com may be arranged extending in the X direction, and the common electrode com may be arranged extending in the Y direction.

The vertical driver 22 illustrated in FIG. 1 and FIG. 2 applies the vertical scan pulse to the gates of the thin film transistors Tr in the pixels Vpix through the scan line 24 illustrated in FIG. 4 to thereby sequentially select one row (one horizontal line), as a target of display driving, from among the pixels Vpix formed in the matrix in the display unit 21. The horizontal driver 23 illustrated in FIG. 1 and FIG. 2 supplies the pixel signals to the pixels Vpix including one horizontal line sequentially selected by the vertical driver 22 through the respective data lines 25 illustrated in FIG. 4. In the pixels Vpix, the display of one horizontal line is performed according to the supplied pixel signals.

As explained above, the display device 1 drives the vertical driver 22 so as to sequentially scan the scan lines 24, and one horizontal line is thereby sequentially selected. In the display device 1, the horizontal driver 23 supplies the pixel signals to the pixels Vpix belonging to the one horizontal line, and the horizontal line is thereby displayed one by one. When performing the display operation, the drive electrode driver applies the common potential Vcom of the common electrodes com corresponding to the one horizontal line.

Figure 5:
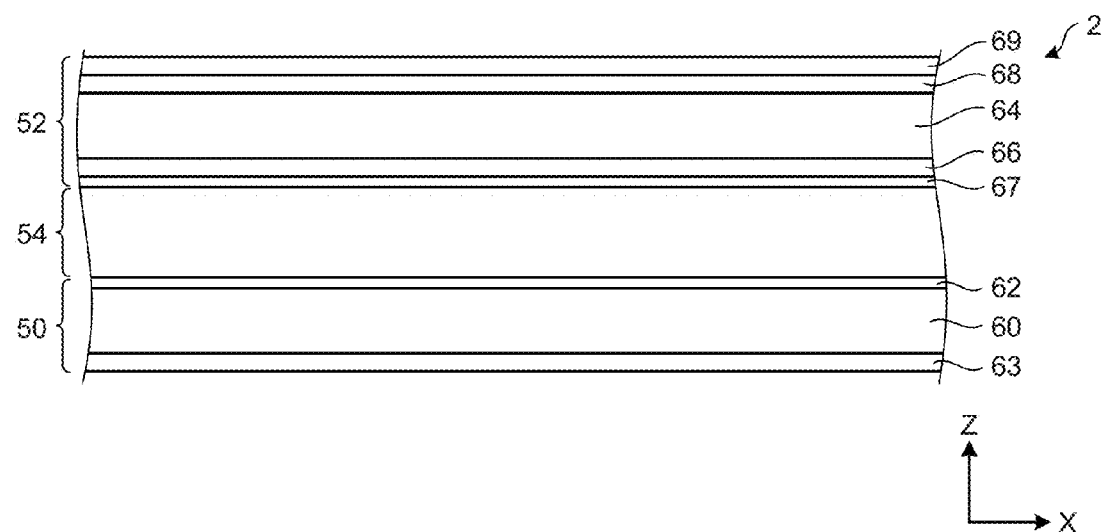
FIG. 5 is a cross-sectional view of an example of a liquid crystal display unit.

The configuration of the display unit 21 will be explained in detail next. FIG. 5 is a cross-sectional view of an example of a liquid crystal display unit. As illustrated in FIG. 5, the liquid crystal display unit 2 includes a first substrate (upper substrate) 50, a second substrate (lower substrate) 52 arranged opposite thereto in the direction perpendicular to the surface of the first substrate, and the liquid crystal layer 54 inserted between the first substrate 50 and the second substrate 52. The backlight 6 is provided on the other side of the first substrate 50 which is opposed to a liquid crystal disposed 54 side.

The liquid crystal layer 54 modulates the light passing therethrough according to the state of the electric field, and is driven in a horizontal electric field mode such as fringe field switching (FFS) or in-plane switching (IPS).

The first substrate 50 includes a pixel substrate 60 which is a translucent substrate such as glass, a first orientation film 62 layered on the liquid crystal layer 54 side of the pixel substrate 60, and a first polarizer 63 layered on the side opposite to the liquid crystal layer 54 side of the pixel substrate 60. The pixel substrate 60 will be explained later. The first orientation film 62 is used to orient the liquid crystal molecules in the liquid crystal layer 54 in a predetermined direction, and is in direct contact with the liquid crystal layer 54. The first orientation film 62 is formed of, for example, a polymer material such as polyimide, and is formed by performing, for example, rubbing processing on applied polyimide, etc. The first polarizer 63 has a function of converting the light incident from the backlight 6 side to linearly polarized light.

The second substrate 52 includes a counter substrate 64 which is a translucent substrate such as glass, a color filter 66 formed on the liquid crystal layer 54 side of the counter substrate 64, a second orientation film 67 formed on the liquid crystal layer 54 side of the color filter 66, a retardation film 68 formed on the side opposite to the liquid crystal layer 54 side of the counter substrate 64, and a second polarizer 69 formed on the side opposite to the counter substrate 64 side of the retardation film 68. The color filter may be formed on the first substrate 50 instead of the second substrate 52.

The color filter 66 includes color regions colored in three colors of, for example, red (R), green (G), and blue (B). The color filter 66 is configured to periodically array the color regions colored in the three colors, for example, red (R), green (G), and blue (B) in openings 76b, and to associate the color regions in the three colors: R, G, and B grouped as a set serving as a pixel Pix with the pixels Vpix illustrated in FIG. 4. The color filter 66 faces the liquid crystal layer 54 in the direction perpendicular to the pixel substrate 60. The color filter may be a combination of other colors if the color regions are colored in different colors. In the color filter, the luminance of the color region of green (G) is generally higher than the luminance of the color region of red (R) and the color region of blue (B). The color filter 66 may be formed so that a black matrix 76a covers the outer periphery of each pixel Vpix illustrated in FIG. 4. The black matrixes 76a are arranged on boundaries each between two-dimensionally arranged pixel Vpix and pixel Vpix, and a lattice shape is thereby formed. The black matrix 76a is formed of a material having a high light absorptivity. As illustrated in FIG. 2, one of the capacitance detection units 30 is preferably provided to pixels Vpix which are associated with each other as one of the pixels Pix. Thereby calculation to calculate the capacitance value corresponding to the image input gradation input to each pixel Pix can be simplified.

The second orientation film 67 is used to orient the liquid crystal molecules in the liquid crystal layer 54 in a predetermined direction similarly to the first orientation film 62, and is in direct contact with the liquid crystal layer 54. The second orientation film 67 is formed of, for example, a polymer material such as polyimide, and is formed by performing, for example, rubbing processing on applied polyimide, etc. The retardation film 68 has a viewing angle compensation function that improves a viewing angle problem caused by the first polarizer 63 and the second polarizer 69. The second polarizer 69 has a function of absorbing a linearly polarized light component parallel to a polarizer absorption axis and transmitting a polarized light component orthogonal thereto. The first polarizer 63 and the second polarizer 69 have functions of transmitting/blocking the light depending on ON/OFF state of the liquid crystal.

Figure 6:
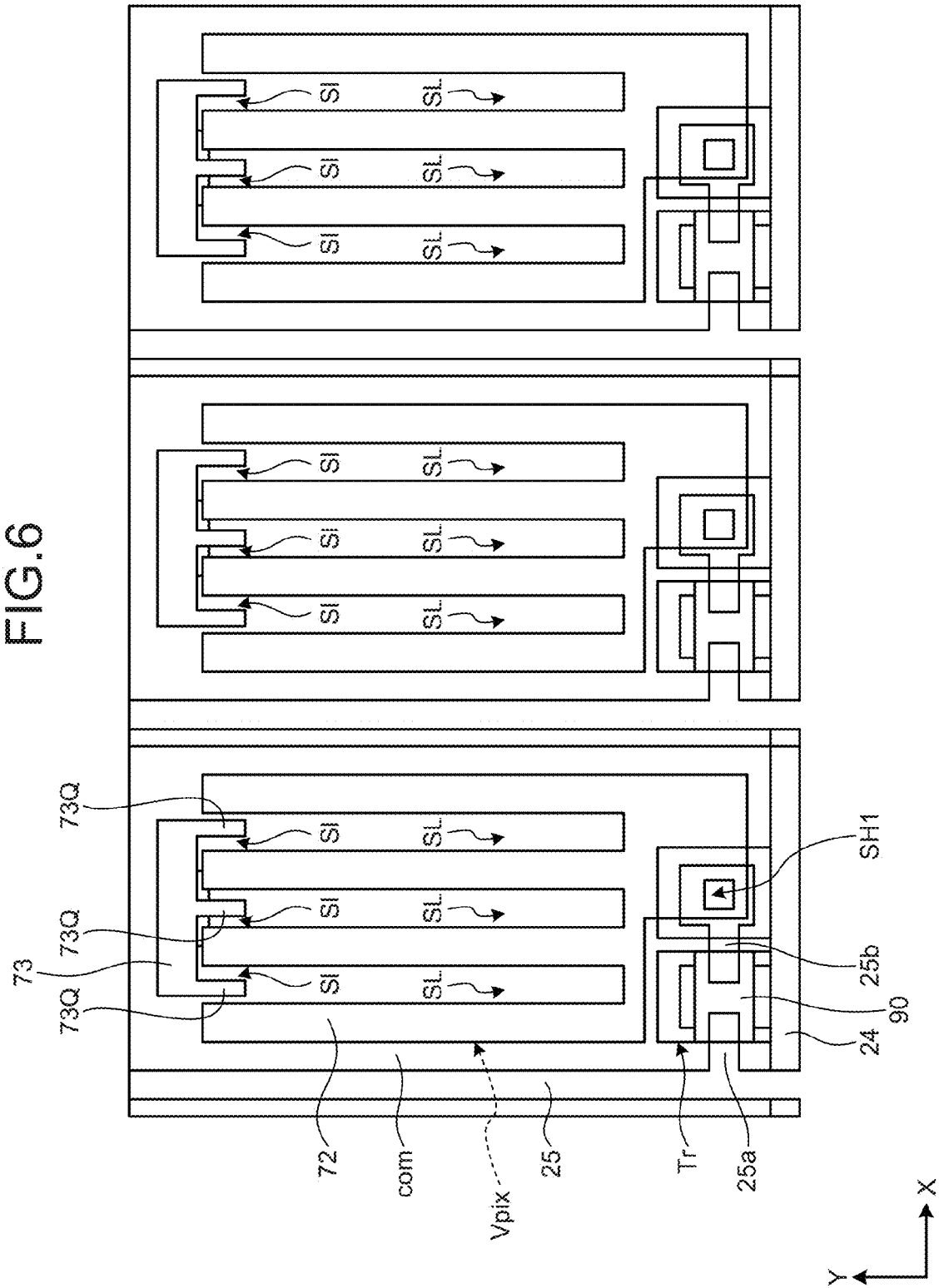
FIG. 6 is a schematic plan view of pixels in the display device according to the first embodiment.
Figure 7:
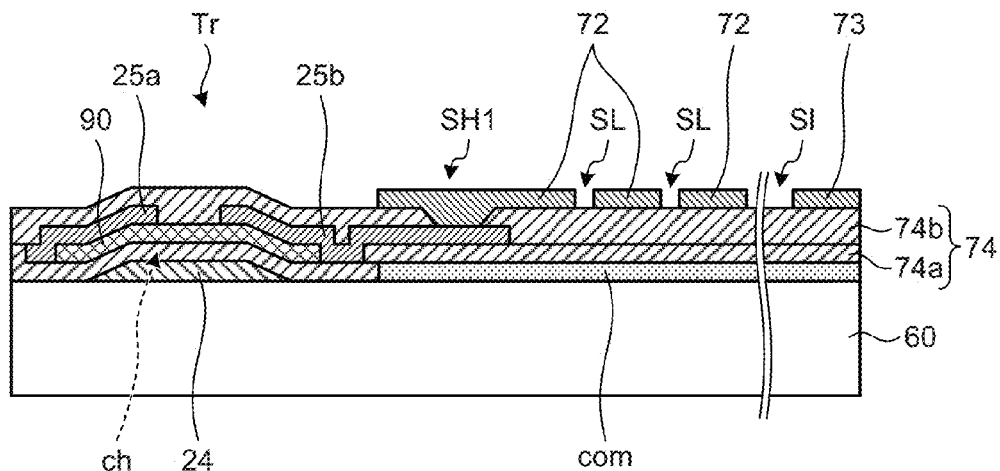
FIG. 7 is a schematic cross-sectional view of an example of a pixel substrate and layers stacked on the pixel substrate in the display device according to the first embodiment.

The pixel substrate 60 will be explained next with reference to FIG. 6 and FIG. 7. FIG. 6 is a schematic plan view of pixels in the display device according to the first embodiment. FIG. 7 is a schematic cross-sectional view of an example of the pixel substrate and layers stacked on the pixel substrate in the display device according to the first embodiment. The pixel substrate 60 is a translucent substrate on which various circuits are formed, a plurality of pixel electrodes 72 is arranged in the matrix on the pixel substrate 60, and the common electrode com is arranged on the pixel substrate 60. As illustrated in FIG. 7, the pixel electrode 72 and the common electrode com are insulated from each other by an insulating layer 74 and face each other in the direction perpendicular to the surface of the pixel substrate 60. The pixel electrode 72 and the common electrode com are translucent electrodes formed by a translucent conductive material (translucent conductive oxide) such as indium tin oxide (ITO). In the first embodiment, a first electrode on the upper side is the pixel electrode 72 and a second electrode on the lower side is the common electrode com. However, the first electrode may be set as the common electrode com, and the second electrode may be set as the pixel electrode 72.

A semiconductor layer 90 where the thin film transistor serving as a switching element of each of the pixels Vpix is formed and wirings such as the data line 25 for supplying a pixel signal to each of the pixel electrodes 72 and the scan line 24 for driving the thin film transistor are layered on the pixel substrate 60 through the insulating layer 74.

The insulating layer 74 has an insulating film 74a between the scan line 24 and the semiconductor layer 90 and an insulating film 74b between the pixel electrodes 72 and the common electrode com, which are layered. More specifically, the insulating film 74a is layered on a location (layer) where each portion is in contact with the pixel substrate 60 or with the scan line 24. The insulating film 74b is layered on a location (layer) where each portion is in contact with the surface of the data line 25, the semiconductor layer 90, or of the insulating film 74a. The insulating film 74a and the insulating film 74b according to the present embodiment are an inorganic insulating layer of silicon nitride (SiNx) or silicon oxide. The material forming the layers of the insulating films 74a and 74b is not limited thereto. The insulating films 74a and 74b may be formed of the same insulating material, or either one of them may be formed of a different insulating material.

As illustrated in FIG. 6 and FIG. 7, the scan line 24 three-dimensionally intersects with part of the semiconductor layer 90 to act as a gate of the thin film transistor Tr. There is one portion at which the scan line 24 and part of the semiconductor layer 90 three-dimensionally intersect with each other, and the thin film transistor Tr is a single gate transistor with an n-channel region ch. The thin film transistor Tr may be a double gate transistor, or any functional element as long as it has a switching function. The semiconductor layer 90 is formed of, for example, amorphous silicon or low temperature polysilicon. The data line 25 extends on a plane parallel to the surface of the pixel substrate 60, and supplies a pixel signal for displaying an image on a pixel. The semiconductor layer 90 is in contact with a source 25a coupled at part thereof to the data line 25, and is electrically coupled at the other portion to a drain 25b formed on the same layer as the data line 25. The drain 25b according to the present embodiment is electrically coupled to the pixel electrode 72 by a through hole SH1. In the present embodiment, the scan line 24 is a wiring of metal such as molybdenum (Mo) and aluminum (Al), and the data line 25 is a wiring of metal such as aluminum. On the pixel substrate 60 according to the present embodiment, the scan line 24 and the common electrode com, the insulating film 74a, the data line 25 and the semiconductor layer 90, the insulating film 74b, and the pixel electrodes 72 are layered in this order.

Slits SL are formed with respect to the pixel electrodes 72 corresponding to the pixels Vpix, and the liquid crystal layer 54 is driven by an electric field (fringe electric field) leaked from the slits SL in the pixel electrodes 72 of the electric field formed between the common electrode com and the pixel electrodes 72.

A capacitance detection electrode 73 is provided on the same layer as that of the pixel electrode 72 in a region where the capacitance detection electrode 73 does not overlap with the pixel electrode 72. As illustrated in FIG. 7, the capacitance detection electrode 73 and the common electrode com face each other through the insulating layer 74. Therefore, a capacitance affected by the liquid crystal layer 54 is held between the capacitance detection electrode 73 and the common electrode com. The capacitance detection electrode 73 is comb-shaped, and its comb teeth 73Q enter the slits SL of the pixel electrode 72. There is a space S1 between each comb tooth 73Q and the pixel electrode 72, so that each comb tooth 73Q and the pixel electrode 72 are non-conductive. The liquid crystal molecules of the liquid crystal layer 54 are rotated by the electric field, and thereby the optical transmittance and the capacitance of the dielectric material change. The above structure enables the capacitance detection electrode 73 to detect a value of the capacitance of the dielectric material corresponding to the rotation of the liquid crystal molecules. Because the comb teeth 73Q are provided, the capacitance detection electrode 73 thereby easily detects the value of the capacitance of the dielectric material corresponding to the rotation of the liquid crystal molecules. The case of the capacitance detection electrode 73 being comb-shaped has been explained; however, it may have no comb teeth 73Q or may have only one comb tooth 73Q. The capacitance detection electrode 73 is an example of the capacitance detection unit 30, but the capacitance detection unit 30 is limited thereto.

Figure 8:
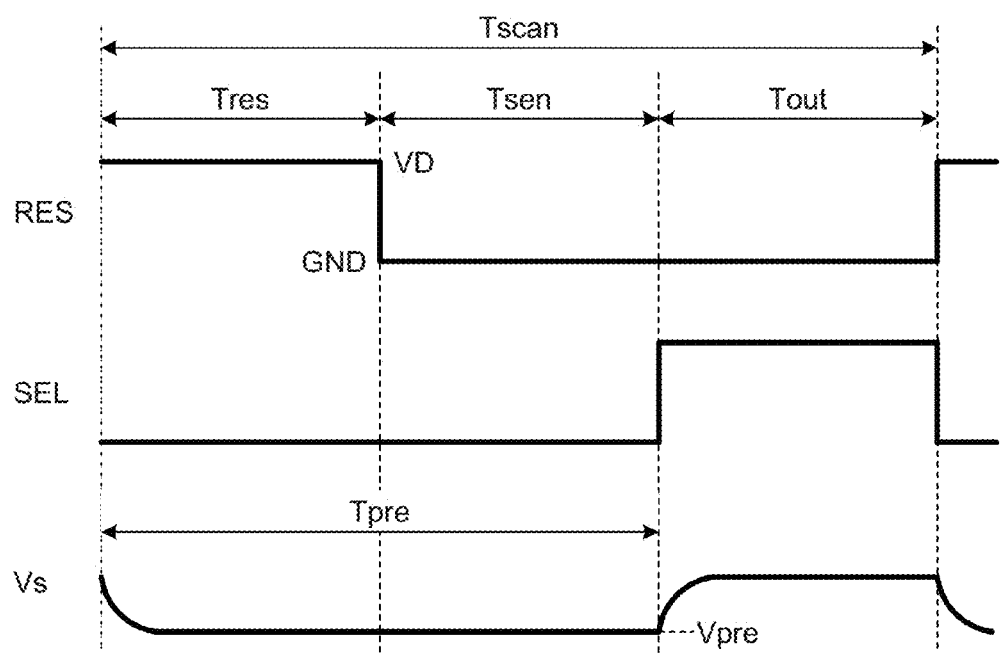
FIG. 8 is an explanatory diagram for explaining a detection period of a capacitance.
Figure 9:
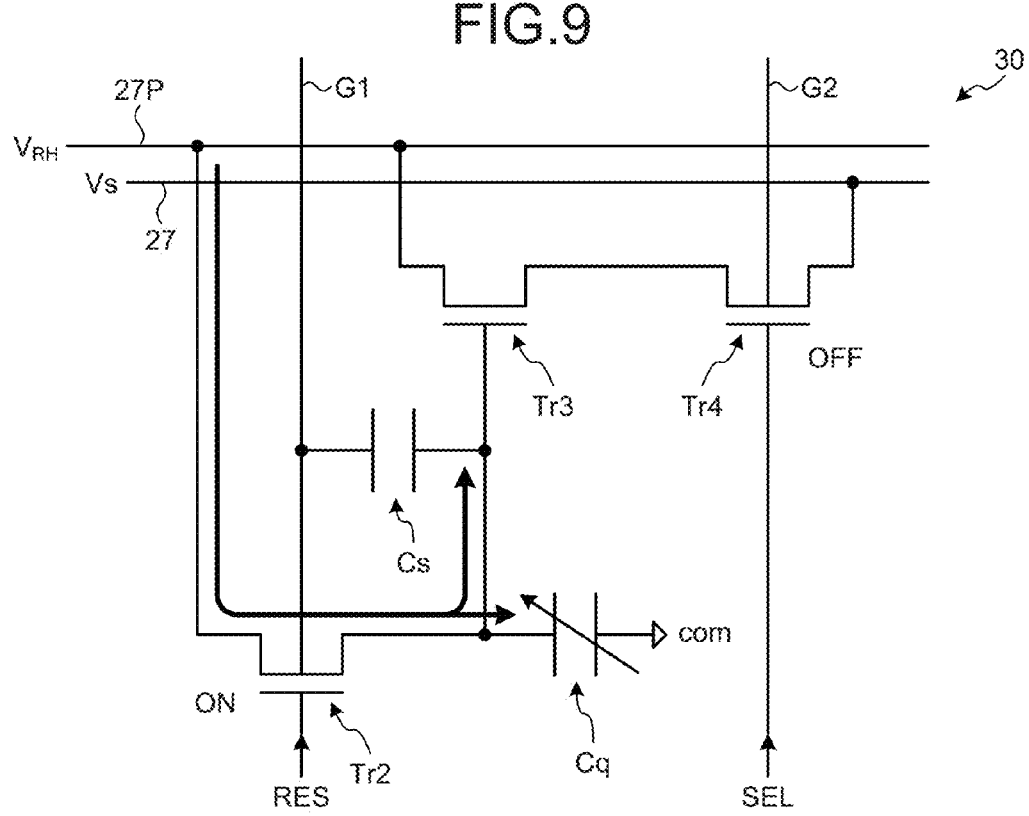
FIG. 9 is a circuit diagram for explaining a capacitance detection unit of the display device according to the first embodiment.
Figure 10:
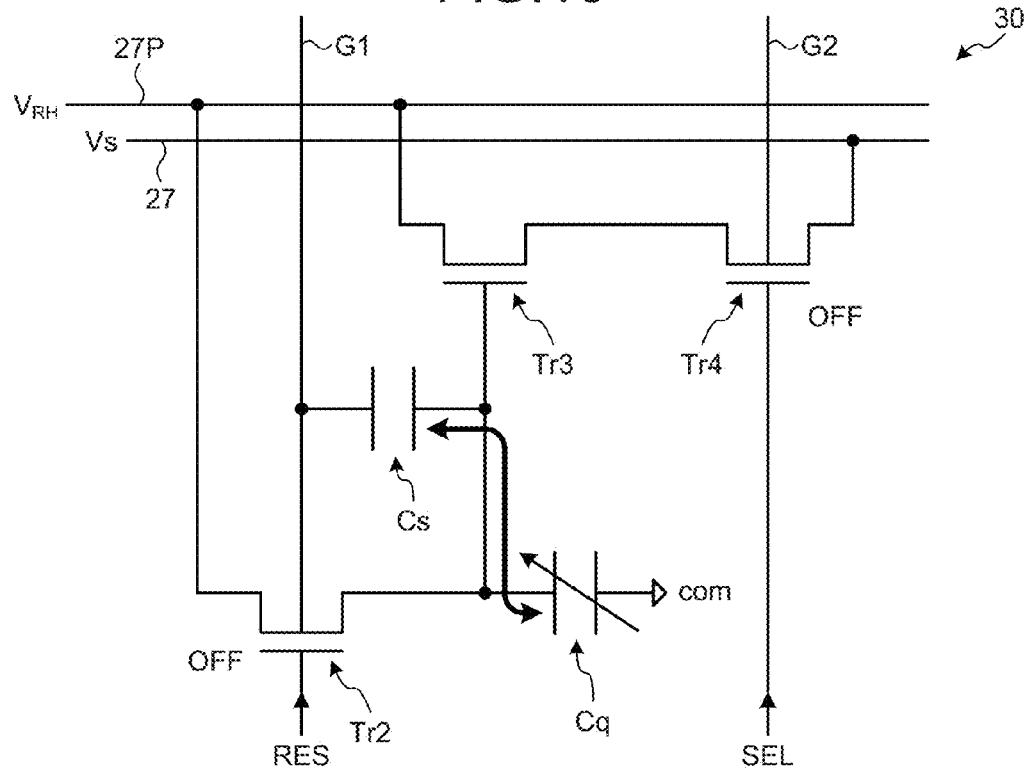
FIG. 10 is a circuit diagram for explaining the capacitance detection unit of the display device according to the first embodiment.
Figure 11:
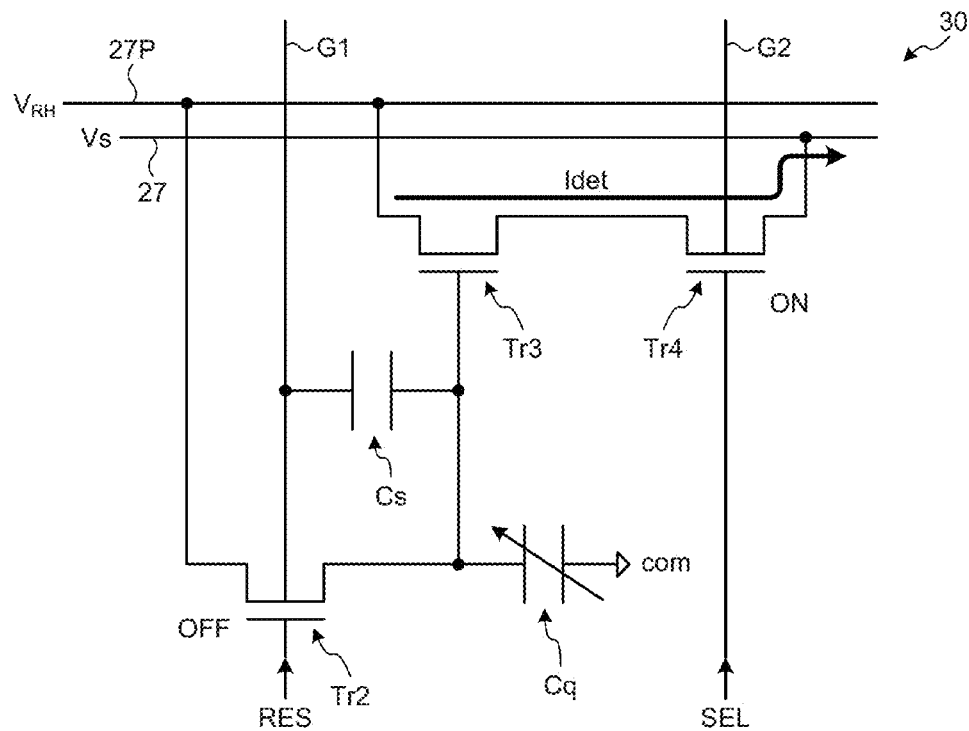
FIG. 11 is a circuit diagram for explaining the capacitance detection unit of the display device according to the first embodiment.

FIG. 8 is an explanatory diagram for explaining a detection period of the capacitance. FIG. 9 to FIG. 11 are circuit diagrams each for explaining a capacitance detection unit of the display device according to the first embodiment. As illustrated in FIG. 8, the capacitance detection circuit 26 performs an operation of detecting a capacitance of one capacitance detection unit 30 during a capacitance detection period Tscan in which a reset period Tres, a sensing period Tsen, and a read-out period Tout are set as one unit.

As illustrated in FIG. 9, the capacitance detection unit 30 includes a reset transistor (second transistor) Tr2, an amplification transistor (third transistor) Tr3, and a selection transistor (fourth transistor) Tr4. These transistors are formed with TFT similarly to the thin film transistor Tr of the pixel circuit and are formed in the same process.

The gate of the reset transistor Tr2 is supplied with a reset signal RES via a first control line G1. The drain of the reset transistor Tr2 is coupled to a power wire 27P and the source thereof is coupled to the gate of the amplification transistor Tr3. A voltage VRH is supplied from the capacitance detection circuit 26 to the power wire 27P.

The drain of the amplification transistor Tr3 is coupled to the power wire 27P and the source thereof is coupled to the drain of the selection transistor Tr4. The source of the selection transistor Tr4 is coupled to the capacitance detection line 27 and the gate thereof is supplied with a selection signal SEL via a second control line G2.

A reference capacitor Cs is provided between the gate of the amplification transistor Tr3 and the first control line G1.

In the reset period Tres illustrated in FIG. 8, the level of the reset signal RES becomes VD, and the reset transistor Tr2 illustrated in FIG. 9 becomes an ON state. At this time the selection signal SEL illustrated in FIG. 8 is a low level, and the selection transistor Tr4 becomes an OFF state. As illustrated in FIG. 9, the potential of the gate of the amplification transistor Tr3 is reset to the power supply potential VRH.

In the sensing period Tsen, the level of the reset signal RES changes from VD to GND (=0V). Then, as illustrated in FIG. 10, the reset transistor Tr2 becomes the OFF state. Because the first control line G1 is coupled to one electrode of the reference capacitor Cs, the reference capacitor Cs functions as a coupling capacitance, and the gate potential of the amplification transistor Tr3 changes when the level of the reset signal RES changes.

As explained above, the liquid crystal molecules of the liquid crystal layer 54 are rotated by the electric field, and the value of the capacitance of the dielectric material and the optical transmittance change according to the rotation. A capacitance value Cq of the capacitance of the liquid crystal can be detected as a variation ΔV due to capacitive coupling with the reference capacitor Cs. For the reference capacitor Cs, if the capacitance is large, the variation ΔV due to capacitive coupling becomes small, while if the capacitance value Cs is small, the variation ΔV becomes large. Therefore, by adjusting the capacitance of the reference capacitor Cs, the change in the capacitance of a capacitance detection unit 30 of the predetermined reference can be reflected in the gate potential.

In the read-out period Tout, the selection signal SEL changes from the low level to a high level. Then, as illustrated in FIG. 11, the selection transistor Tr4 becomes the ON state. Thereby a detection current Idet corresponding to the gate potential of the amplification transistor Tr3 flows in the capacitance detection line 27. In the read-out period Tout, to surely set the selection transistor Tr4 to be the ON state, it is preferable to pre-charge the potential of the capacitance detection line 27 to a pre-charge potential Vpre before the read-out period Tout. In this example, as illustrated in FIG. 8, the reset period Tres and the sensing period Tsen are set as a pre-charge period Tpre, and the pre-charge potential Vpre is supplied to the capacitance detection line 27 during this period.

Figure 12:
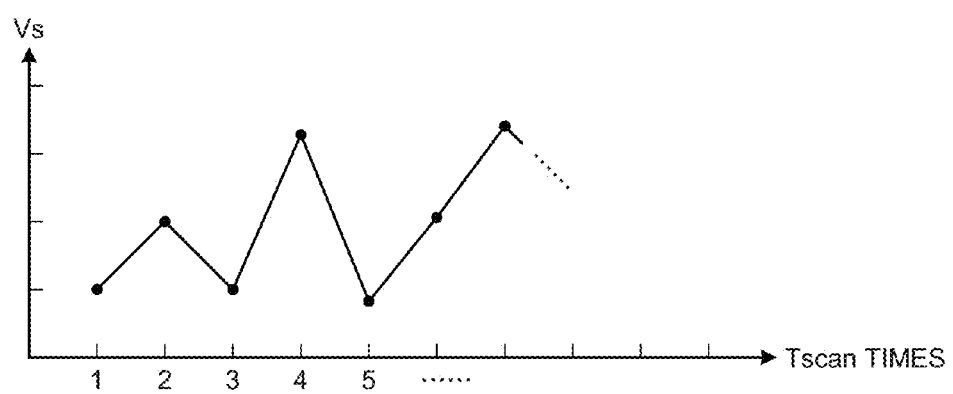
FIG. 12 is an explanatory diagram for explaining a relationship between the number of detection times of capacitance for the display device according to the first embodiment and a capacitance.
Figure 13:
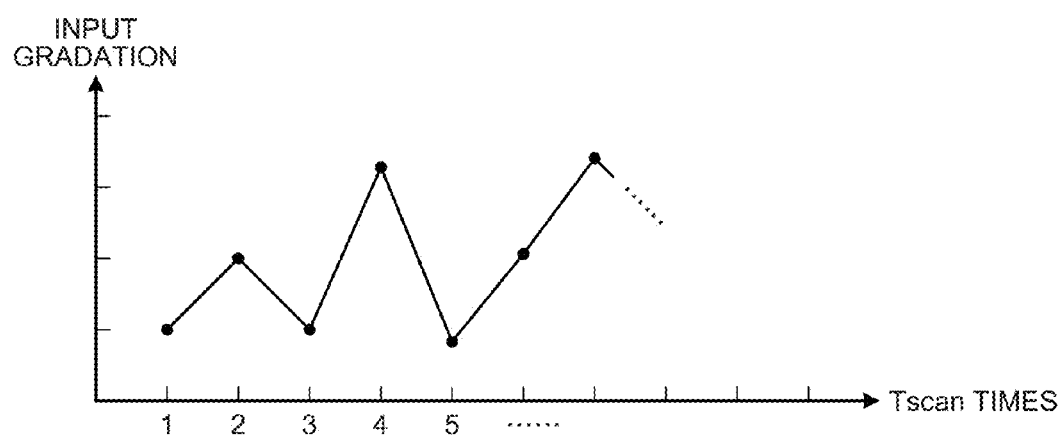
FIG. 13 is an explanatory diagram for explaining a relationship between the number of detection times of capacitance for the display device according to the first embodiment and an input gradation when the capacitance is detected.

The change of the capacitance due to the capacitance detection electrode 73 will be explained below with reference to FIG. 12 and FIG. 13. FIG. 12 is an explanatory diagram for explaining a relationship between the number of detection times of capacitance for the display device according to the first embodiment and the capacitance. FIG. 13 is an explanatory diagram for explaining a relationship between the number of detection times of capacitance for the display device according to the first embodiment and an input gradation when the capacitance is detected. For the liquid crystal layer 54, a potential corresponding to the image input gradation is supplied to the pixel electrode 72 to be acted on the dielectric anisotropy of the dielectric material of the liquid crystal, and optical anisotropy appears. At this time, a dielectric constant (∈//) in a long-axis direction of the liquid crystal molecules and a dielectric constant (∈⊥) in a short-axis direction of the liquid crystal molecules change according to the electric field applied to between the common electrode com and the pixel electrode 72. As illustrated in FIG. 12, if the image input gradation is different in each capacitance detection period Tscan, the capacitance detection unit 30 indicates capacitance values according to the image input gradation as long as the state of the liquid crystal is within an assumed operating temperature range. Therefore, there is a correlation between the image input gradation in each capacitance detection period Tscan illustrated in FIG. 13 and a capacitance value Vs in each capacitance detection period Tscan illustrated in FIG. 12.

Figure 14:
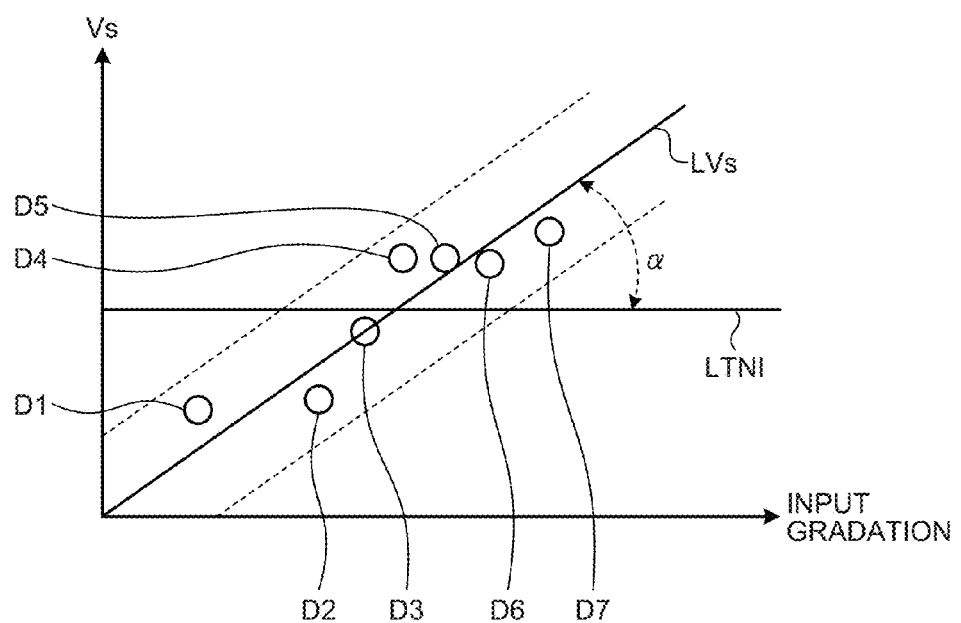
FIG. 14 is an explanatory diagram for explaining a relationship between the capacitance of the display device according to the first embodiment and the input gradation.

FIG. 14 is an explanatory diagram for explaining a relationship between the capacitance of the display device according to the first embodiment and the input gradation. For example, as illustrated in FIG. 14, when the vertical axis represents the capacitance value Vs in each capacitance detection period Tscan and the horizontal axis represents the input gradation in each capacitance detection period Tscan, and if, for example, seven detected values in the capacitance detection period Tscan are plotted as correlation values D1 to D7 of the capacitance with respect to the image input gradation, a correlation in which the correlation values D1 to D7 are arrayed can be approximated by a correlation line LVs.

Figure 15:
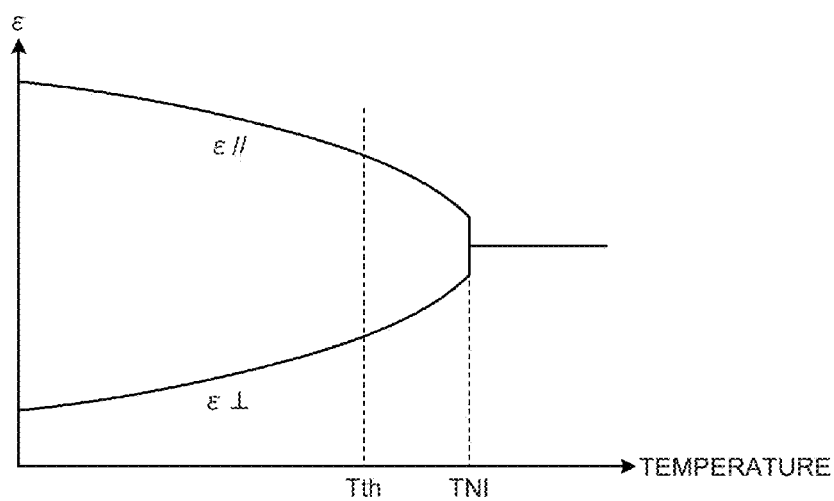
FIG. 15 is an explanatory diagram for explaining a relationship between a dielectric constant in a liquid crystal layer of the display device according to the first embodiment and a temperature.

FIG. 15 is an explanatory diagram for explaining a relationship between a dielectric constant in the liquid crystal layer of the display device according to the first embodiment and a temperature. When the temperature in the liquid crystal layer exceeds an isotropic phase transition temperature TNI, a dielectric constant c does not change. When the temperature exceeds the isotropic phase transition temperature TNI, the dielectric constant c does not change as illustrated in FIG. 14, and therefore correlation values of the capacitance with respect to the image input gradation are plotted on a temperature upper limit line LTNI where the capacitance value Vs is constant regardless of the magnitude of the input gradation.

The control device 4 calculates a relative angle α between the temperature upper limit line LTNI and the correlation line LVs, and simply determines that the display is abnormal when the relative angle α is smaller than a threshold angle corresponding to a threshold temperature Tth which is a predetermined temperature illustrated in FIG. 15 because the display image may be disturbed. The control device 4 calculates the relative angle α between the temperature upper limit line LTNI and the correlation line LVs, and simply determines that the display is normal when the relative angle α is equal to or larger than the threshold angle corresponding to the predetermined threshold temperature Tth illustrated in FIG. 15.

Figure 16:
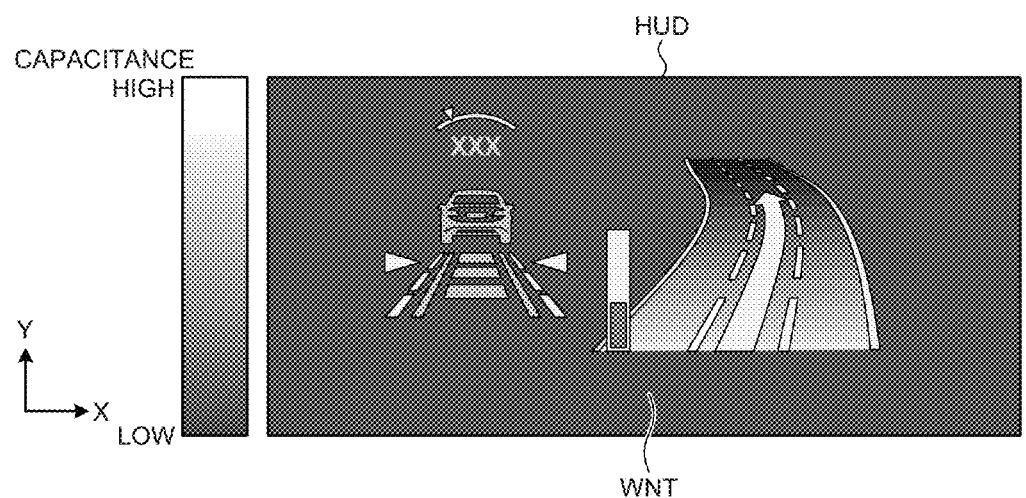
FIG. 16 is an explanatory diagram for explaining a change in capacitance associated with a temperature change of the display device according to the first embodiment.
Figure 17:
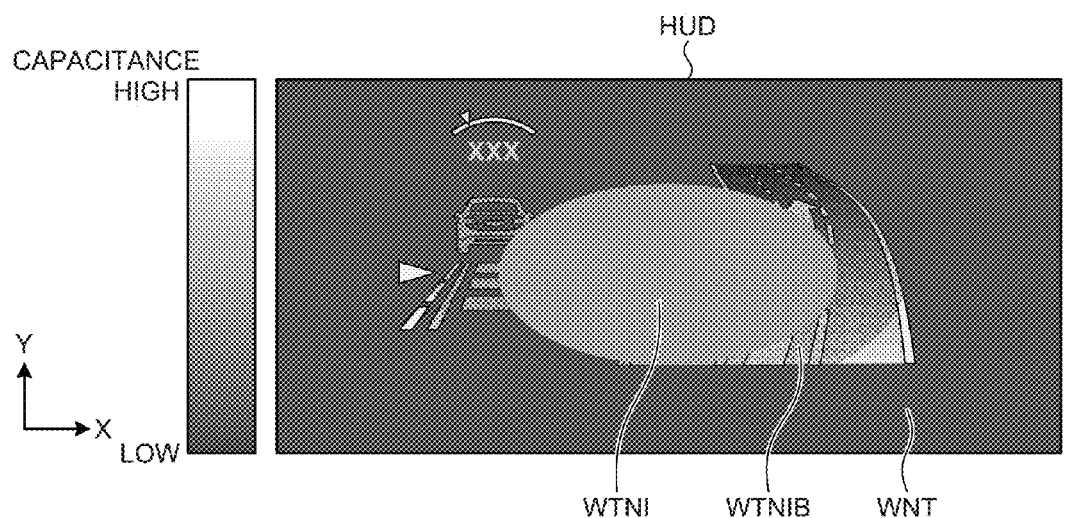
FIG. 17 is an explanatory diagram for explaining a case where a change in capacitance associated with a temperature change of the display device according to the first embodiment appears in part of the display unit.
Figure 18:
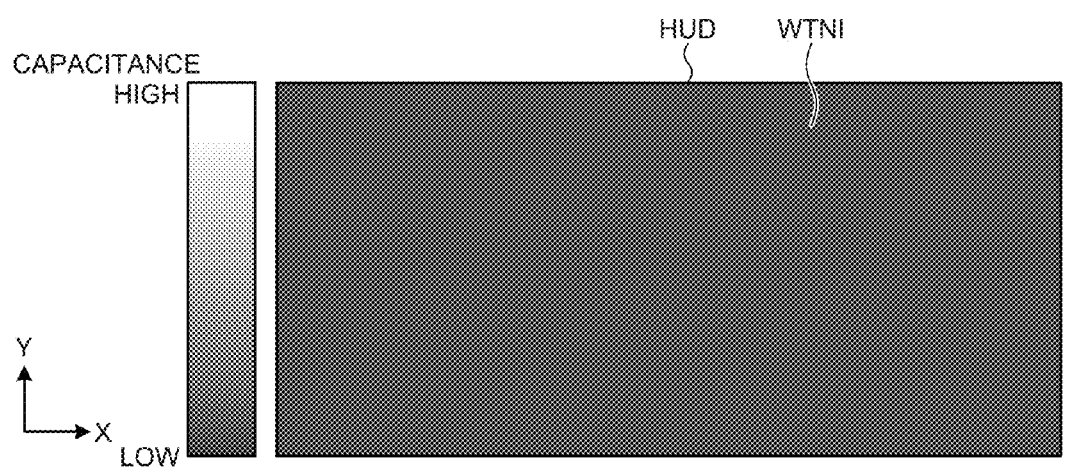
FIG. 18 is an explanatory diagram for explaining a case where a change in capacitance associated with a temperature change of the display device according to the first embodiment does not occur.

FIG. 16 to FIG. 18 are explanatory diagrams for explaining a change in capacitance associated with the temperature change of the display device according to the first embodiment. FIG. 16 depicts display in gradation in which, when the display of an image HUD on the display unit 21 is normal display WNT, an input gradation corresponding to high capacitance is displayed in white and the input gradation corresponding to low capacitance is displayed in black. FIG. 17 depicts a state in which, although part of the display of the image HUD on the display unit 21 the same as that of FIG. 16 is the normal display WNT, parts thereof are abnormal display WTNI and abnormal display WTNIB. The abnormal display WTNI indicates a state in which the temperature of the liquid crystal molecules already reaches the isotropic phase transition temperature TNI, and the abnormal display WTNIB indicates a state in which the temperature of the liquid crystal molecules reaches the threshold temperature Tth. In the display device, heat is in many cases stored in a central portion of the display unit 21 due to a state of heat conduction inside a housing. The display device may detect the temperature of the display unit 21 using a temperature sensor; however, it is easier to provide a capacitance detector (capacitance detection unit 30) to the central portion of the display unit 21 than to provide a temperature sensor to the central portion of the display unit 21. The display unit 21 according to the first embodiment is provided with the capacitance detection unit 30 in the center display region 31M which overlaps the abnormal display WTNIB, and can therefore detect the temperature that exceeds the isotropic phase transition temperature TNI partially occurring in the liquid crystal layer 54. For example, the capacitance detection unit 30 can more speedily detect the abnormal display WTNIB by increasing the detection density of the center display region 31M, and by decreasing each detection density of the upper left corner display region 31LU, the lower left corner display region 31LD, the upper right corner display region 31RU, and the lower right corner display region 31RD, when the respective regions of the same area are compared with each other. Moreover, by increasing the frequency or the number of times of selecting and detecting the capacitance detection unit 30 in the center display region 31M more than that in the other regions, it is possible to more speedily detect the abnormal display WTNIB.

Figure 19:
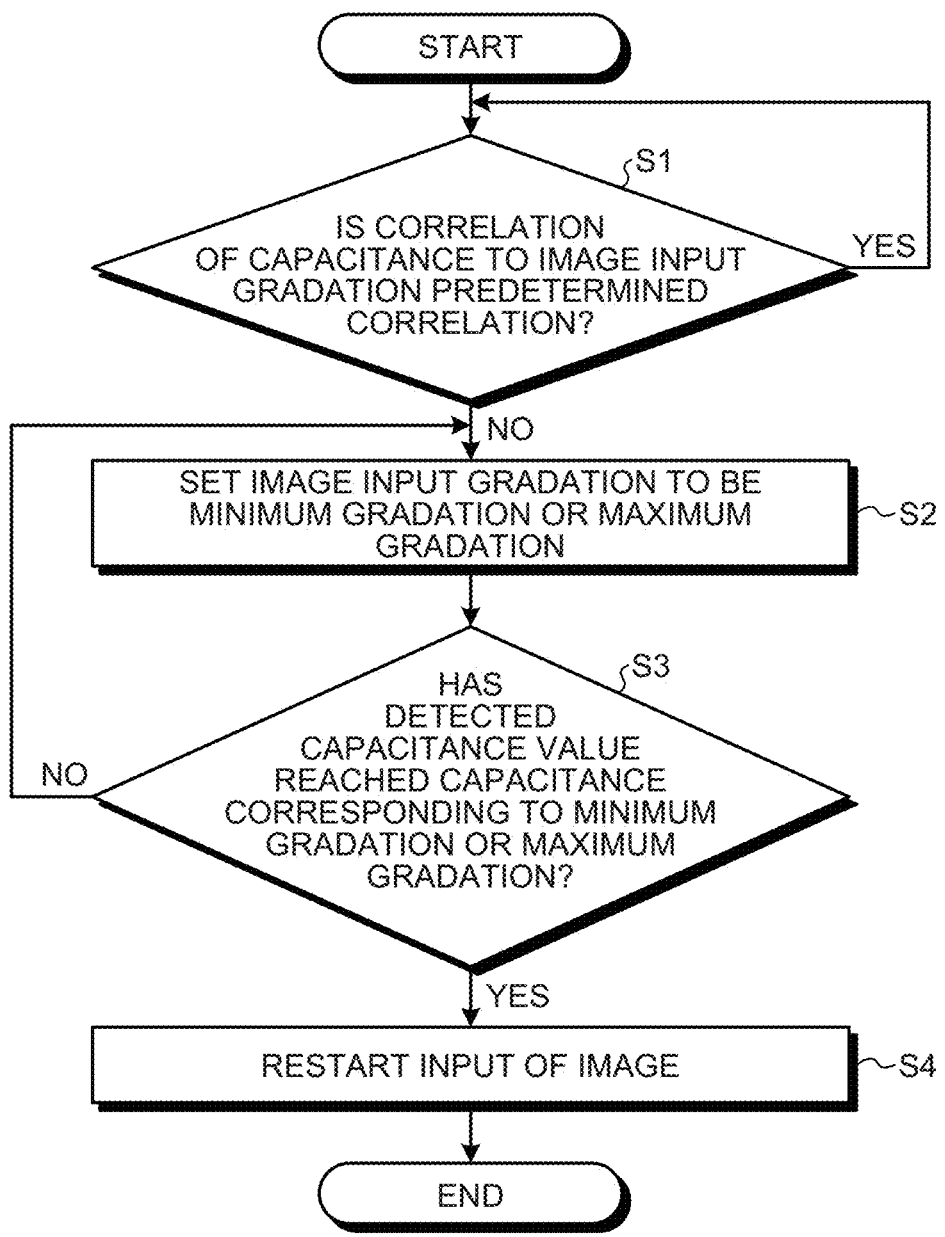
FIG. 19 is a flowchart of determining a state of a dielectric material for the display device according to the first embodiment.

FIG. 18 depicts a state in which the entire surface of the display of the image HUD on the display unit 21 the same as that illustrated in FIG. 16 is the abnormal display WTNI. The control device 4 becomes difficult to detect a detection signal of a magnitude corresponding to the value of capacitance of the dielectric material that changes according to the input gradation if the supply of image input is stopped to make a pause of use of the display device when the abnormal display is detected as illustrated in FIG. 18. Therefore, the control device 4 controls the display device according to the flowchart illustrated in FIG. 19. FIG. 19 is a flowchart of determining a state of the dielectric material for the display device according to the first embodiment.

As illustrated in FIG. 19, the control device 4 selects a specific capacitance detection unit 30, and determines whether the correlation of the capacitance to the input gradation is a predetermined correlation (Step S1). For example, the control device 4 calculates a relative angle α between the temperature upper limit line LTNI and the correlation line LVs, determines that the display is normal when the relative angle α becomes equal to or larger than the threshold angle corresponding to the predetermined threshold temperature Tth illustrated in FIG. 15 (Yes at Step S1), and repeats the determination of Step S1 by obtaining a value of the capacitance which is sampled at a different sampling time point and input from the same capacitance detection electrode 73 after a predetermined interval. Alternatively, when the same input image gradation as any one of input image gradations with respect to capacitance previously detected by a capacitance detection electrode 73 is input to a pixel Vpix whose capacitance is detected by the capacitance detection electrode 73, the control device 4 may not perform the determination of Step S1; whereas, when an input image gradation different from all of the input image gradations with respect to capacitance previously detected by a capacitance detection electrode 73 is input to a pixel Vpix whose capacitance is detected by the capacitance detection electrode 73, the control device 4 may perform the determination of Step S1 by obtaining a value of capacitance which is sampled by the capacitance detection electrode 73 at a different sampling time point.

The control device 4 selects a specific capacitance detection unit 30, and, when it is determined that the display is abnormal because the correlation of the capacitance to the image input gradation is not the predetermined correlation and the relative angle α becomes smaller than the threshold angle corresponding to the predetermined threshold temperature Tth illustrated in FIG. 15 (No at Step S1), stops the image input, and sets the input gradation to be minimum gradation or maximum gradation (Step S2). When the relative angle α becomes smaller than the threshold angle corresponding to the predetermined threshold temperature Tth illustrated in FIG. 15, the capacitance values are constant as illustrated in FIG. 14, which is close to an intermediate value between the capacitance value indicated by the minimum gradation of the image input gradation and the capacitance value indicated by the maximum gradation of the image input gradation. On the other hand, when the temperature of the display unit 21 falls within the operating temperature range and the liquid crystal molecules function normally, the capacitance detection unit 30 can detect the capacitance value corresponding to the minimum gradation of the image input gradation or the capacitance value corresponding to the maximum gradation thereof.

When the capacitance value detected by the capacitance detection unit 30 is not the capacitance value corresponding to the minimum gradation or the capacitance value corresponding to the maximum gradation (No at Step S3), the control device 4 keeps the image input gradation to be the minimum gradation or the maximum gradation (Step S2). At Step S2, the control device 4 may alternately repeat the state in which the image input gradation is the minimum gradation and the state in which the image input gradation is the maximum gradation, calculate the relative angle α, and determine whether the capacitance value detected by the capacitance detection unit 30 has reached the capacitance value corresponding to the minimum gradation or the capacitance value corresponding to the maximum gradation.

When the capacitance value detected by the capacitance detection unit 30 has reached the capacitance value corresponding to the minimum gradation or the capacitance value corresponding to the maximum gradation (Yes at Step S3), the control device 4 restarts the image input (Step S4). In the display device 1 according to the first embodiment, when it is determined that the display is abnormal, the control device 4 stops the supply of the image input, and sets the image input gradation to be the minimum gradation or the maximum gradation instead of the image input. Thereby the display device 1 provides the viewer with the image whose input gradation is represented by the minimum gradation or the maximum gradation and which is displayed in the entire display unit, and can continuously detect a detection signal for the value of capacitance of the dielectric material corresponding to the minimum gradation or the maximum gradation of the image input gradation while causing the viewer to recognize that the display is in the abnormal state. Therefore, the display device 1 according to the first embodiment can provide the normal display to the viewer when the display is recovered.

As explained above, the display device according to the first embodiment includes the pixels Vpix on the display unit 21, the capacitance detection units 30, and the control device 4. The display unit 21 includes the liquid crystal layer 54 including the dielectric material which is provided between the pixel substrate 60 and the counter substrate 64 and has the dielectric anisotropy and the optical anisotropy. The display unit 21 further includes the pixel circuits that apply an electric field to the dielectric material according to an image input gradation for each of the pixels Vpix arranged in a matrix, and displays the image using the pixels Vpix. The capacitance detection unit 30 outputs a detection signal of the magnitude corresponding to the value of the capacitance of the dielectric material in the liquid crystal layer 54. The control device 4 stores a plurality of detection signals output by the capacitance detection units 30, and determines that the display is normal when the correlation value of the capacitance to the image input gradation is in the predetermined correlation. This enables the display device 1 to directly detect that the display is normal with responsiveness of the display state.

When the change in the value of the capacitance to the image input gradation is a predetermined threshold or less, the control device 4 determines that the display is abnormal. When the liquid crystal layer 54 is used beyond the assumed operating temperature range, the display device 1 can determine the possibility of disturbance in the display image and stop the display because the optical properties that should respond to the electric field applied to the liquid crystal layer 54 are not exhibited. Consequently, the control device 4 of the display device 1 according to the first embodiment can adequately recognize the state of the liquid crystal layer 54.

When the value of the capacitance to the image input gradation does not change, the control device 4 determines that the display is abnormal. This enables the control device 4 to recognize that the liquid crystal molecules as a target to be detected by the capacitance detection unit 30 exceeds the isotropic phase transition temperature TNI. When the display unit 21 is at low temperature, a phase transition of the liquid crystal molecules occurs according to the applied electric field, which causes the value of the capacitance to the image input gradation not to change. In this way, the control device 4 of the display device 1 according to the first embodiment can detect display abnormality beyond the assumed operating temperature range even if it is low temperature or high temperature.

As the information on the value of capacitance based on the detection signals, information on the values of the capacitance which are sampled at different sampling time points and input from the same capacitance detection unit 30 is input to the control device 4. Thereby the number of capacitance detection units 30 can be suppressed. As a result, the black matrix 76a around the pixel Vpix decreases, and an opening ratio increases.

The display device 1 according to the first embodiment selects the capacitance detection unit 30 corresponding to the pixel Vpix in which the maximum gradation of the image input gradation or the minimum gradation thereof is displayed, and continuously detects the capacitance after it is determined that the display is abnormal. Because of this, when the liquid crystal molecules function normally, the capacitance detection unit 30 can detect the capacitance value corresponding to the minimum gradation of the image input gradation or the capacitance value corresponding to the maximum gradation thereof.

The display device 1 according to the first embodiment is not limited to this aspect, and therefore it may be configured to preferentially select, as the specific capacitance detection unit 30 selected at Step S1, the capacitance detection unit 30 that detects the capacitance of the pixel Vpix to which the maximum gradation of the image input gradation or the minimum gradation thereof is input, from the information on the image that the control device 4 previously displays on the display unit 21. It is thereby possible to preferentially detect the capacitance of the pixel Vpix with a high signal-to-noise ratio in the correlation value of the capacitance to the image input gradation, thus enhancing detection sensitivity. As for the specific capacitance detection unit 30 selected at Step S1, it may also be configured to select any capacitance detection unit 30 except for the capacitance detection unit 30 that detects the capacitance of the pixel Vpix in which the image input gradation (intermediate gradation) corresponding to the temperature upper limit line LTNI is displayed, from the information on the image that the control device 4 previously displays on the display unit 21. It is thereby possible to preferentially detect the capacitance of the pixel Vpix with a high signal-to-noise ratio in the correlation value of the capacitance to the image input gradation, thus enhancing detection sensitivity.

It is preferable that the control device 4 receives information on the value of capacitance based on the detection signals from the capacitance detection units 30 arranged in the upper left corner display region 31LU, the lower left corner display region 31LD, the center display region 31M, the upper right corner display region 31RU, and the lower right corner display region 31RD. It is thereby possible to recognize the state of the liquid crystal molecules in each of the display regions within the plane of the display unit 21 and determine whether the surface of the display unit 21 is in a partially normal display state or in a partially abnormal display state.

Second Embodiment

Figure 20:
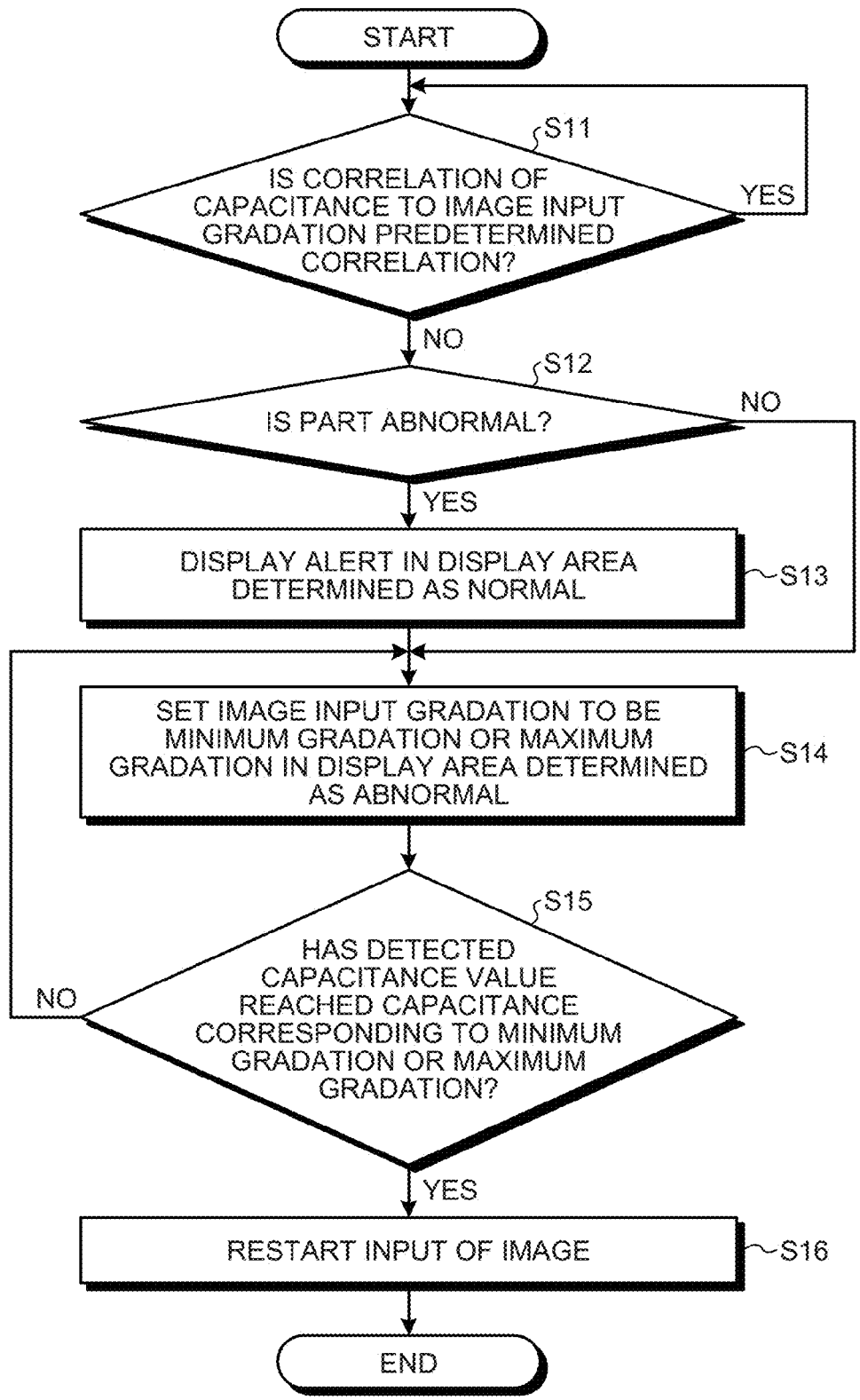
FIG. 20 is a flowchart of determining a state of a dielectric material of a display device according to a second embodiment.
Figure 21:
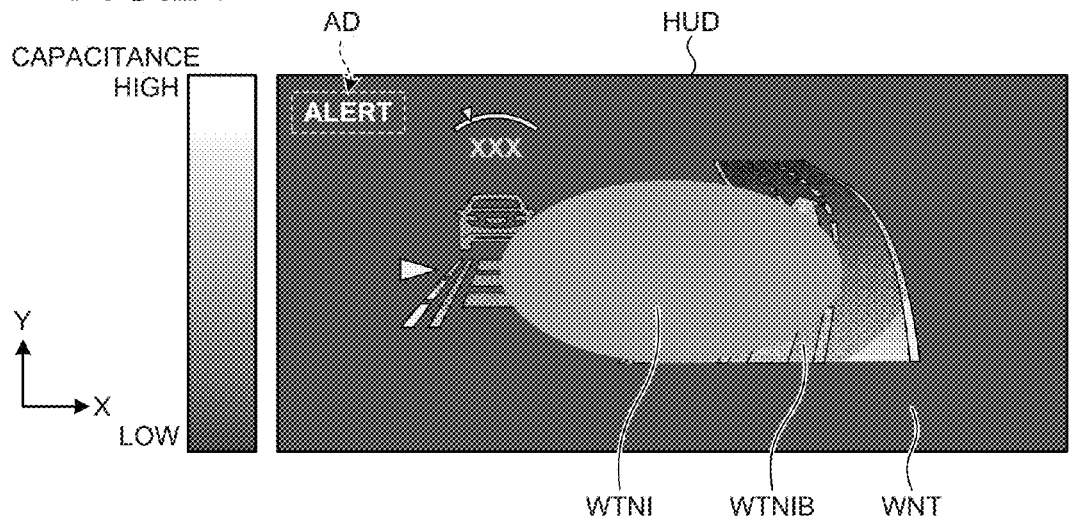
FIG. 21 is an explanatory diagram for explaining a case in which part of display of the display unit in the display device according to the second embodiment is normal display.

FIG. 20 is a flowchart of determining the state of the dielectric material for the display device according to a second embodiment. FIG. 21 is an explanatory diagram for explaining a case in which part of display of the display unit in the display device according to the second embodiment is normal display. The same reference signs are assigned to the same components as these described in the embodiment, and overlapping explanation is omitted.

As illustrated in FIG. 20, the control device 4 sequentially selects a plurality of capacitance detection units 30, and determines whether the correlation of the capacitance to the image input gradation is a predetermined correlation (Step S11). For example, the control device 4 selects the capacitance detection units 30 in the center display region 31M, the upper left corner display region 31LU, the lower left corner display region 31LD, the upper right corner display region 31RU, and the lower right corner display region 31RD, and determines whether the correlation of the capacitance to the image input gradation is a predetermined correlation. When the correlation of the capacitance to the image input gradation is the predetermined correlation, it is determined that the display is normal. When the correlation of the capacitance to the image input gradation is not the predetermined correlation, it is determined that the display is abnormal. In the second embodiment, when it is determined that the display of at least one of the display regions is abnormal, the determination result of Step S11 is negative (No at Step S11). When the temperature determining unit 402 determines that the display of all the display regions is normal based on the capacitance values sent from the capacitance detection units 30 in all display regions (Yes at Step S11), the temperature determining unit 402 repeats the determination of Step S11. In Step S11, the temperature determining unit 402 stores information on display regions which are determined as normal.

Cases where the display is abnormal will be explained below. The display unit 21 illustrated in FIG. 21 indicates an example in which the center display region 31M is at high temperature and an alert indication AD is displayed in a part of the normal display WNT included in the display of the image HUD. As illustrated in FIG. 21, when the center display region 31M is at high temperature, it is determined that the display is abnormal (No at Step S11), and it is determined that part of the display, that is, the center display region 31M in this example, is abnormal (Yes at Step S12). The control device 4 displays the alert indication AD (performs alert display) in one of the display regions determined as normal (Step S13). In the example illustrated in FIG. 21, the alert indication AD is displayed in the upper left corner display region 31LU. In addition, the control device 4 sets the image input gradation to be the minimum gradation or the maximum gradation in the display region determined as abnormal, for example, in the center display region 31M (Step S14). Thereby the display device 1 provides the image in which the center display region 31M (display region as a part of the display unit) is represented by the minimum gradation or the maximum gradation to the viewer, and can continuously detect a detection signal for the value of capacitance of the dielectric material corresponding to the minimum gradation or the maximum gradation of the image input gradation while the viewer is caused to recognize that the display is abnormal in the center display region 31M (display region as a part of the display unit).

When it is determined that the display is abnormal in, for example, not only the center display region 31M but also all the display regions (No at Step S11, and No at Step S12), and the control device 4 proceeds the processing to Step S14.

The control device 4 sets the image input gradation to be the minimum gradation or the maximum gradation in the display region determined as abnormal (Step S14).

Subsequently, when the capacitance value detected by the capacitance detection unit 30 is not the capacitance value corresponding to the minimum gradation or the capacitance value corresponding to the maximum gradation (No at Step S15), the control device 4 keeps the image input gradation to be the minimum gradation or the maximum gradation (Step S14).

When the capacitance value detected by the capacitance detection unit 30 is the capacitance value corresponding to the minimum gradation or the capacitance value corresponding to the maximum gradation (Yes at Step S15), the control device 4 restarts the image input (Step S16).

As explained above, in the display device 1 according to the second embodiment, the capacitance detection unit 30 is arranged in each of the display regions within the plane of the display unit 21, and the control device 4 determines that the display is normal or abnormal in each of the display regions. This enables the display device 1 according to the second embodiment to give an alert with alert indication that the display is abnormal in the display region determined as normal.

Third Embodiment

Figure 22:
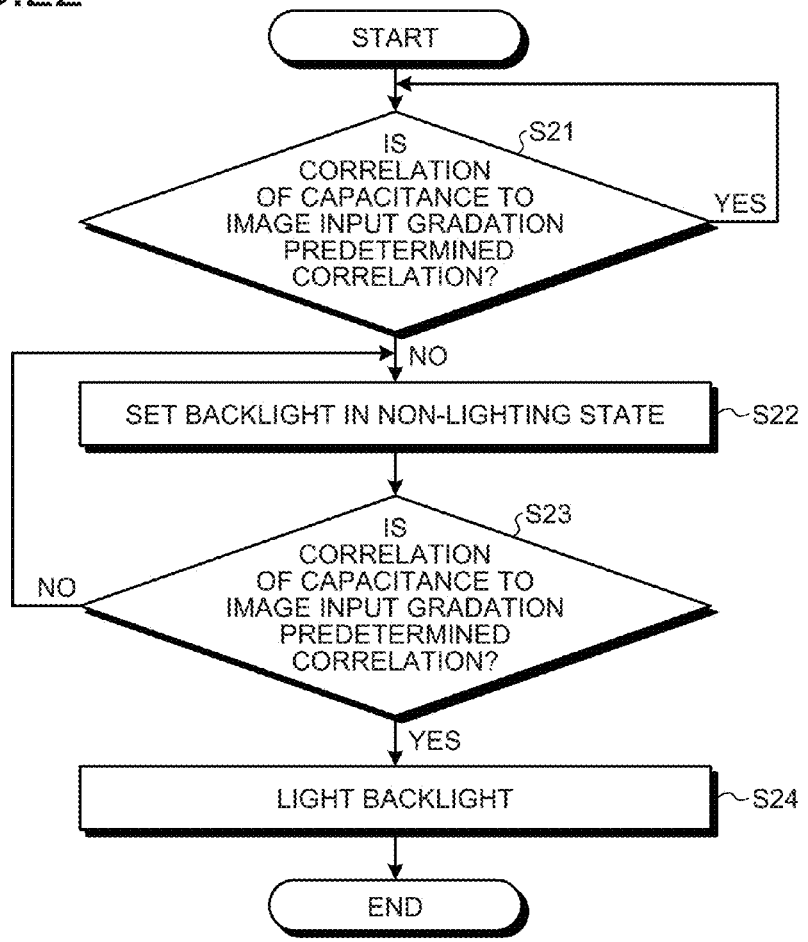
FIG. 22 is a flowchart of determining a state of a dielectric material for the display device according to a third embodiment.

FIG. 22 is a flowchart of determining the state of the dielectric material for the display device according to a third embodiment. The same reference signs are assigned to the same components as these described in the embodiments, and overlapping explanation is omitted.

As illustrated in FIG. 22, the control device 4 selects a specific capacitance detection unit 30, and determines whether the correlation of the capacitance to the image input gradation is a predetermined correlation (Step S21). For example, the control device 4 calculates a relative angle α between the temperature upper limit line LTNI and the correlation line LVs, determines that the display is normal when the relative angle α becomes equal to or larger than the threshold angle corresponding to the predetermined threshold temperature Tth illustrated in FIG. 15 (Yes at Step S21), and repeats the determination of Step S21 by obtaining a value of the capacitance which is sampled at a different sampling time point and input from the same capacitance detection electrode 73 after a predetermined interval.

The control device 4 selects a specific capacitance detection unit 30, and, when it is determined that the display is abnormal because the correlation of the capacitance to the image input gradation is not the predetermined correlation and the relative angle α becomes smaller than the threshold angle corresponding to the predetermined threshold temperature Tth illustrated in FIG. 15 (No at Step S21), sets the backlight 6 in the non-lighting state (Step S22).

Subsequently, the control device 4 selects the specific capacitance detection unit 30, and determines whether the correlation of the capacitance to the image input gradation is the predetermined correlation (Step S23). The control device 4 selects the specific capacitance detection unit 30, and, when it is determined that the display is abnormal because the correlation of the capacitance to the image input gradation is not the predetermined correlation and the relative angle α is smaller than the threshold angle corresponding to the predetermined threshold temperature Tth illustrated in FIG. 15 (No at Step S23), keeps the backlight to be in the non-lighting state (Step S22).

The control device 4 calculates a relative angle α between the temperature upper limit line LTNI and the correlation line LVs, and, when it is determined that the display is normal when the relative angle α becomes equal to or larger than the threshold angle corresponding to the predetermined threshold temperature Tth illustrated in FIG. 15 (Yes at Step S23), lights the backlight 6 (Step S24). The display device 1 according to the third embodiment does not stop the image input. Therefore, when the liquid crystal layer 54 is displayed normally, the capacitance detection unit 30 can detect an appropriate capacitance value according to the image input gradation.

As explained above, in the display device 1 according to the third embodiment, when it is determined that the display is abnormal, the control device 4 sets the backlight 6 in the non-lighting state. Thereby even if the control device 4 continues the supply of the image input, the display contents of the display device 1 becomes invisible and this therefore enables the viewer to recognize the occurrence of abnormality. Then, when the capacitance value becomes the value of capacitance of the dielectric material that changes according to the image input gradation, the display device 1 lights the backlight 6 and can show the display contents to the viewer because the display is normal. In the display device 1 according to the third embodiment, when it is determined that the display is abnormal, the control device 4 sets the backlight 6 in the non-lighting state; however, the embodiment is not limited thereto, and the light source control unit 423 may reduce the light amount of the backlight 6 so as to make it difficult to see the display contents of the display device 1. Thereby even if the control device 4 continues the supply of the image input, the display contents of the display device 1 are made hard to see. This enables the viewer to recognize the occurrence of abnormality and does not give uncomfortable feeling to the viewer. Then, when the capacitance value becomes the value of capacitance of the dielectric material that changes according to the image input gradation, the display is normal, and therefore the display device 1 increases the light amount of the backlight 6 and can show the display contents to the viewer.

In the display device 1 according to the third embodiment, the capacitance detection unit 30 is arranged in each of the display regions within the plane of the display unit 21 similarly to the display device according to the second embodiment, and the control device 4 may determine that the display is normal or abnormal in each of the display regions. When the backlight 6 includes a plurality of light sources arrayed along the X direction or the Y direction so that the light sources can be separately driven, that is, so that the light amount of each of the light sources is independently controlled, the display control unit 413 may partially suppress the light amount for the display region where the display is abnormal.

Fourth Embodiment

Figure 23:
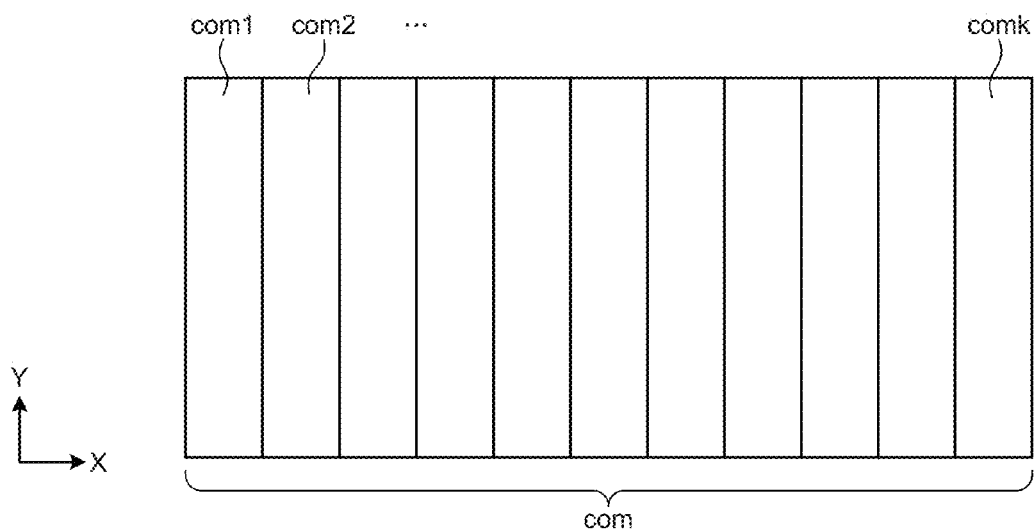
FIG. 23 is a schematic plan view of a pixel substrate in a display device according to a fourth embodiment.
Figure 24:
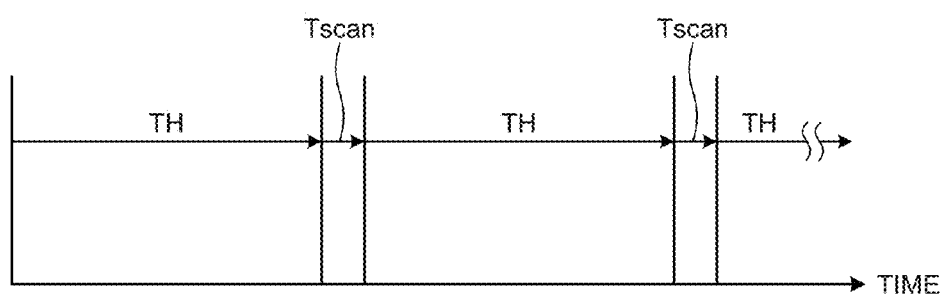
FIG. 24 is a schematic explanatory diagram of how to detect a capacitance of the display device according to the fourth embodiment.

FIG. 23 is a schematic plan view of the pixel substrate for the display device according to a fourth embodiment. FIG. 24 is a schematic explanatory diagram of how to detect a capacitance of the display device according to the fourth embodiment. The same reference signs are assigned to the same components as these described in the embodiments, and overlapping explanation is omitted. The display device according to the fourth embodiment does not include the capacitance detection electrode 73 illustrated in FIG. 7, and the common electrode com is divided into those from a capacitance detection electrode com1 to a capacitance detection electrode comk as illustrated in FIG. 23. With this structure, a potential corresponding to the image input gradation is supplied to the pixel electrode 72, and in a display period TH, illustrated in FIG. 24, during which the display device 1 performs display, all the electrodes from the capacitance detection electrode com1 to the capacitance detection electrode comk are set as the common electrode com and the same common potential Vcom is applied thereto.

Then, in the capacitance detection period Tscan, the display device 1 outputs a capacitance value, as a detection signal, of the dielectric material in the liquid crystal layer 54 that changes according to the image input gradation for each pixel between the pixel electrode 72 and one of the capacitance detection electrode com1 to the capacitance detection electrode comk, to the capacitance detection circuit 26.

In the capacitance detection period Tscan, the display device 1 may scan the capacitance detection electrode com1 to the capacitance detection electrode comk to detect a capacitance value, as a detection signal, of the dielectric material in the liquid crystal layer 54. In the capacitance detection period Tscan, the display device 1 does not need to scan all the capacitance detection electrode com1 to the capacitance detection electrode comk, and may detect a capacitance value of the dielectric material in the liquid crystal layer 54 by using one or more, as part, selected from the capacitance detection electrode com1 to the capacitance detection electrode comk.

The display device 1 according to the first embodiment to the fourth embodiment is a horizontal electric field type liquid crystal display device, and performs a display by forming an electric field between the pixel electrode (second electrode) 72 and the common electrode (first electrode) com and in a direction parallel to the first substrate 50 to thereby rotate the liquid crystal molecules of the liquid crystal layer 54 within the plane parallel to surface of the substrate and by using the change in the optical transmittance corresponding to the rotation of the liquid crystal molecules. The display device 1 according to the first embodiment to the fourth embodiment is not limited to the horizontal electric field type liquid crystal display device, and may therefore drive it in a liquid crystal drive mode, as a mode for driving liquid crystal molecules in the liquid crystal layer 54, using an electric field, a so-called vertical electric field, vertically produced between substrates: between the pixel electrode (second electrode) 72 on the second substrate 52 side and the common electrode (first electrode) com on the first substrate 50 side. As a liquid crystal display device that drives liquid crystal using the vertical electric field, a liquid crystal display device of a vertical electric field type such as a twisted nematic (TN) type, a vertical alignment (VA) type, and an electrically controlled birefringence (ECB) type may be used for the display device 1 according to the first embodiment to the fourth embodiment.

Application Examples

Figure 25:
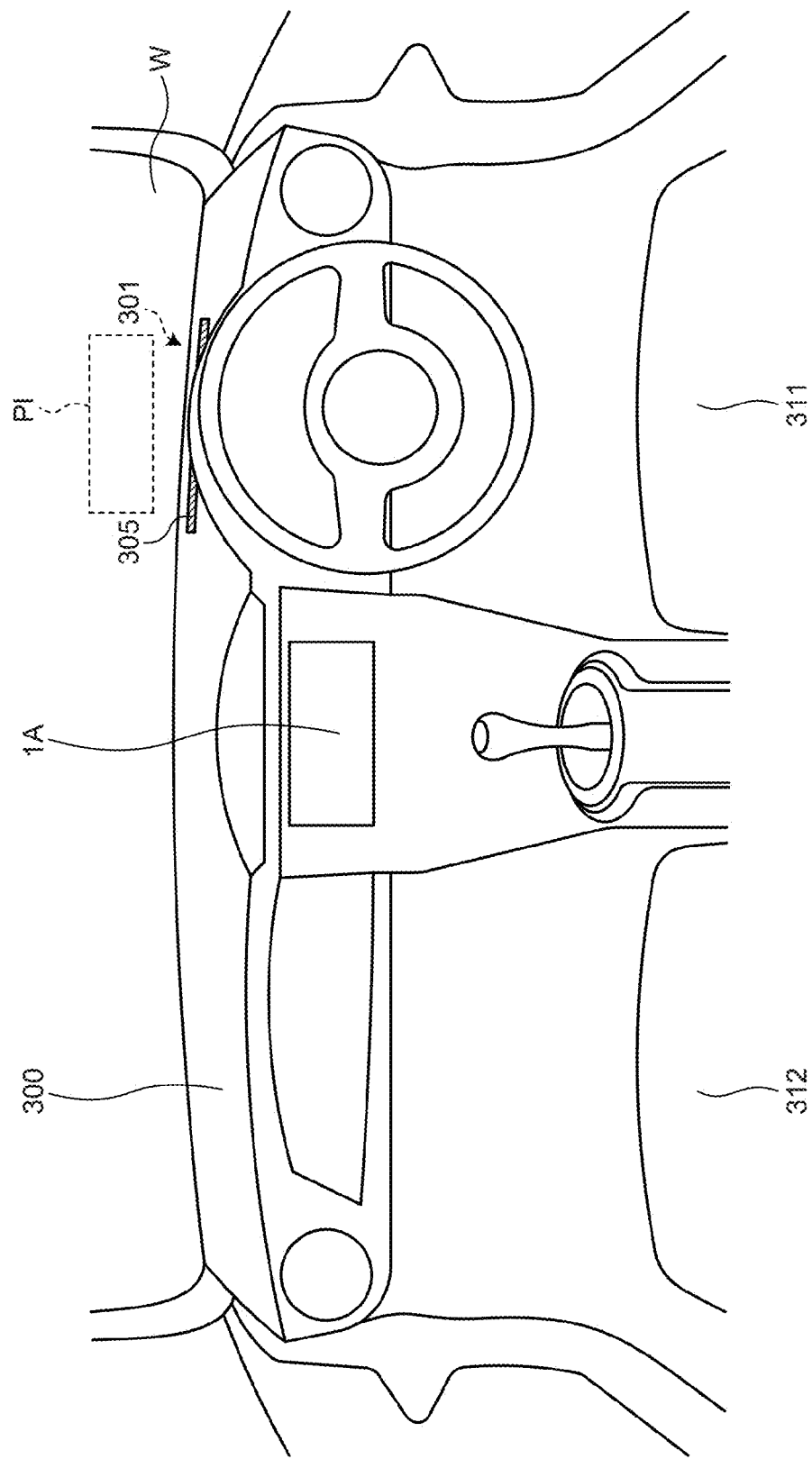
FIG. 25 is a diagram of an example of an electronic apparatus to which the display device according to the present embodiment is applied.

Application examples of the display device 1 as explained in the embodiments will be explained next with reference to FIG. 25. FIG. 25 is a diagram of an example of an electronic apparatus to which the display device according to the present embodiment is applied. The display device 1 according to the present embodiment can be applied to electronic apparatuses in all fields such as a car navigation system, television devices, digital cameras, notebook personal computers, portable electronic apparatuses such as mobile phones, or video cameras. In other words, the display device 1 according to the present embodiment can be applied to electronic apparatuses in all fields that input an externally input video signal or an internally generated video signal as data for image input, and display the data as an image or a video. The electronic apparatus includes the control device 4, illustrated in FIG. 2 and FIG. 3, which supplies a video signal to the display device to control operations of the display device 1.

The electronic apparatus illustrated in FIG. 25 is a head-up display 301 to which the display device 1 according to the present embodiment is applied. The electronic apparatus illustrated in FIG. 25 may be a car navigation device 1A. Because the head-up display 301, the car navigation system, or the like is easily affected by heat inside a vehicle, it is required for the display device 1 to reduce the frequency of the state in which it is used beyond the assumed operating temperature range. The display device 1 as the head-up display 301 is provided to a dashboard 300 inside a car. The car navigation system is provided in, for example, between a driver's seat 311 and a passenger's seat 312 on the dashboard 300. The display device 1 of the car navigation device 1A is used for navigation display, display of music operation screen, or movie playback display, etc.

Application Example 1

Figure 26:
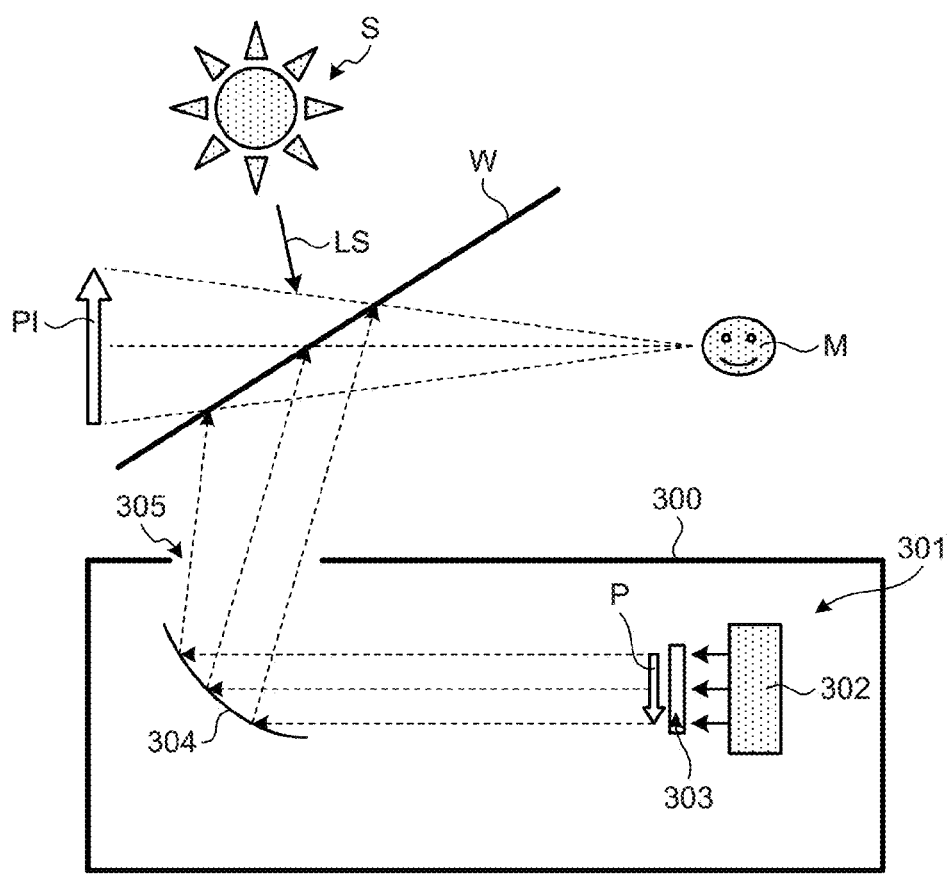
FIG. 26 is a schematic explanatory diagram of a head-up display to which the display device according to the present embodiment is applied.

FIG. 26 is a schematic explanatory diagram of a head-up display to which the display device according to the present embodiment is applied. The head-up display 301 will be explained below with reference to FIG. 25 and FIG. 26. The head-up display 301 is mounted on vehicles such as cars, buses, or trucks, and displays information on an image P on a predetermined projection plane, for example, on a windshield W of the vehicle illustrated in FIG. 25. A driver M of the vehicle can visually recognize the information (virtual image PI of the image P, explained later) displayed on the windshield W without turning away from the foreground.

The head-up display 301 includes a light source 302, a display unit 303, and a mirror 304. The light source 302 is, for example, a light emitting diode (LED) which is provided instead of the backlight 6, but is not limited thereto. The display unit 303 is the same as the liquid crystal display unit 2 of the display device 1 according to the present embodiment, and therefore detailed explanation thereof is omitted.

The mirror 304 is a concave mirror, and can reflect the image P projected by the display unit 303 to the direction of the windshield W. A plurality of mirrors 304 may be provided depending on a positional relation between the display unit 303 and the windshield W, and the head-up display 301 may project the image P projected by the display unit 303 to the windshield W through the mirrors 304. The head-up display 301 may directly project the image P projected by the display unit 303 to the windshield W. In this case, the head-up display 301 has no mirror 304.

The dashboard 300 has an opening 305 on part of the dashboard 300 which is provided at a place opposite to the windshield W and to the mirror 304.

The image P projected by the display unit 303 is reflected by the mirror 304 to pass through the opening 305 and is projected to the windshield W. The mirror 304 enlarges the image P to be projected to the windshield W. The driver M can recognize the virtual image PI of the image P by visually recognizing the image projected by the display unit 303 to the windshield W.

The windshield W of the vehicle is easily irradiated with light (sunlight) LS from the sun S. The sunlight LS irradiated to the windshield W passes through the opening 305 to be reflected by the mirror 304, and is irradiated to the display unit 303. As explained above, the mirror 304 enlarges the image P displayed by the display unit 303 at the time of its reflection and projects the enlarged image to the windshield W. Therefore, the sunlight LS from the windshield W is reduced by the mirror 304 and is irradiated to the display unit 303.

The temperature of the display unit 303 is easily increased by infrared rays contained in the sunlight LS. The sunlight LS is condensed by the mirror 304, and therefore the energy density of the infrared rays irradiated to the display unit 303 is increased. The display unit 303 is stored in the dashboard 300 of the vehicle, and is therefore used in the environment where heat accumulates and is hard to diffuse. Therefore, the display unit 303 is used in the environment where the temperature is easily increased.

As explained above, the head-up display 301 includes the pixels Vpix of the display unit 303, the capacitance detection unit 30, and the control device 4. The display unit 303 includes the first substrate 50 and the second substrate 52 which face each other, the liquid crystal layer 54 including the dielectric material which is held between the first substrate 50 and the second substrate 52 and has the dielectric anisotropy and the optical anisotropy, and displays an image using the pixels Vpix arranged in the matrix. The pixel circuit applies the electric field to the dielectric material in the liquid crystal layer 54 according to the image input gradation for each pixel Vpix. The capacitance detection unit 30 outputs a detection signal of the magnitude corresponding to the value of the capacitance of the dielectric material in the liquid crystal layer 54. The control device 4 stores a plurality of detection signals output by the capacitance detection units 30, and determines that the display is normal when the correlation value of the capacitance to the image input gradation is in the predetermined correlation. This enables the head-up display to directly detect that the display is normal with responsiveness of the display state even in the state where the heat is stored inside the vehicle.

The embodiments are not limited by the contents described above. In addition, the components of the embodiments include those which can be easily thought of by persons skilled in the art, those which are substantially equivalent to each other, and those in a scope of so-called equivalents. Moreover, the components can be omitted, replaced, and modified in various ways within a scape that does not depart from the gist of the embodiments.

What is claimed is:

1. A display device comprising:
a display unit that includes a dielectric material between two substrates that face each other and a plurality of pixel circuits that apply an electric field to the dielectric material according to an image input gradation for each of a plurality of pixels arranged in a matrix, and displays an image using the plurality of pixels;
a capacitance detection unit that outputs a detection signal of a magnitude corresponding to a value of a capacitance of the dielectric material; and
a control device that determines, on a basis of the detection signal from the capacitance detection unit, that the display is normal when a correlation value of the capacitance to the image input gradation is in a predetermined correlation, and that the display is abnormal when a plurality of correlation values of the capacitance to a plurality of image input gradations are not in the predetermined correlation,
wherein the control device determines the plurality of correlation values are not in the predetermined correlation on a basis of at least one selected from a group comprising:
when a change in the plurality of correlation values of the capacitance to the plurality of image input gradations is a predetermined threshold or less,
when the plurality of correlation values of the capacitance to the plurality of image input gradations does not change, or
when an angle between an approximate line based on the plurality of correlation values of the capacitance to the plurality of image input gradations and a predetermined reference line is a predetermined threshold angle or more.

2. The display device according to claim 1, wherein the plurality of correlation values of the capacitance to the plurality of image input gradations are correlation values based on the detection signal that is detected at different time points by the capacitance detection unit.

3. The display device according to claim 1, wherein the capacitance detection unit comprises a plurality of capacitance detection units, each of the plurality of capacitance detection units is arranged in each of a plurality of display regions within a plane of the display unit, and
the plurality of correlation values of the capacitance to the plurality of image input gradations are correlation values based on detection signals that are detected by the plurality of capacitance detection units.

4. The display device according to claim 1, wherein the capacitance detection unit is arranged in each of a plurality of display regions within a plane of the display unit, and
the control device determines whether the display is normal or abnormal for each of the plurality of display regions.

5. The display device according to claim 1, wherein, when it is determined that the display is abnormal,
the control device sets the image input gradation of at least a pixel having a capacitance that is detected by the capacitance detection unit to be a minimum gradation or a maximum gradation.

6. The display device according to claim 3, wherein, when it is determined that the display is abnormal,
the control device sets the image input gradation of at least a pixel having a capacitance that is detected by the capacitance detection unit arranged in a display region having the display that is determined to be abnormal to be a minimum gradation or a maximum gradation.

7. The display device according to claim 1, further comprising an illumination unit that irradiates light toward the display unit,
wherein, when it is determined that the display is abnormal, the control device reduces an amount of light of the illumination unit.

8. The display device according to claim 3, further comprising an illumination unit that irradiates light for each of the plurality of display regions,
wherein, when it is determined that the display of at least one of the plurality of display regions is abnormal, the control device reduces an amount of light of the illumination unit which is irradiated on the at least one of the plurality of display regions.

9. The display device according to claim 4, wherein, when it is determined that part of the display is abnormal,
the control device displays an alert in a display region where the display is determined as normal.

10. The display device according to claim 1, wherein, when it is determined that part of the display is abnormal,
the control device displays an alert in a display region where the display is determined as normal.

11. The display device according to claim 1, wherein the capacitance detection unit includes a plurality of detectors that are arranged such that arrangement density of a portion of the plurality of detectors in a central region of the display unit is different from that of other portions of the plurality of detectors in peripheral regions of the display unit.

12. The display device according to claim 1, wherein the capacitance detection unit outputs the detection signal when the image input gradation of a pixel having a capacitance that is detected by the capacitance detection unit is a minimum gradation or a maximum gradation.

13. The display device according to claim 4, wherein the capacitance detection unit outputs the detection signal when the image input gradation of a pixel having a capacitance that is detected by the capacitance detection unit is a minimum gradation or a maximum gradation.

14. A display device comprising:
a display unit that includes a dielectric material between two substrates that face each other and a plurality of pixel circuits that apply an electric field to the dielectric material according to an image input gradation for each of a plurality of pixels arranged in a matrix, and displays an image using the plurality of pixels;
a capacitance detection unit that outputs a detection signal of a magnitude corresponding to a value of a capacitance of the dielectric material; and
a control device that determines, on a basis of the detection signal from the capacitance detection unit, that the display is normal when a correlation value of the capacitance to the image input gradation is in a predetermined correlation, and that the display is abnormal when a plurality of correlation values of the capacitance to a plurality of image input gradations are not in the predetermined correlation,
wherein, when the control device determines that the display is abnormal, the control device performs one selected from a group comprising:
sets the image input gradation of at least a pixel whose capacitance is detected by the capacitance detection unit to be a minimum gradation or a maximum gradation,
reduces an amount of light of an illumination unit, or
displays an alert in a display region where the display has been determined as normal.

15. A di splay device comprising:
a display unit that includes a dielectric material between two substrates that face each other and a plurality of pixel circuits that apply an electric field to the dielectric material according to an image input gradation for each of a plurality of pixels arranged in a matrix, and displays an image using the plurality of pixels;
one or more capacitance detection units that are arranged in each of a plurality of display regions within a plane of the display unit and output detection signals, each detection signal of the detection signals indicative of a magnitude corresponding to a value of a capacitance of the dielectric material in one of the plurality of display regions; and
a control device that determines, on a basis of the detection signals from the one or more capacitance detection units, that the display is normal for each of the plurality of display regions when a correlation value of the capacitance to the image input gradation is in a predetermined correlation, and that the display is abnormal for each of the plurality of display regions when a plurality of correlation values of the capacitance to a plurality of image input gradations are not in the predetermined correlation.

* * * * *